(12) United States Patent
Larocca

(10) Patent No.: US 9,590,862 B2
(45) Date of Patent: Mar. 7, 2017

(54) GROUP MANAGEMENT AND GRAPHICAL USER INTERFACE FOR ASSOCIATED ELECTRONIC DEVICES

(71) Applicant: Disney Enterprises, Inc., Burbank, CA (US)

(72) Inventor: Scott Douglas Larocca, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 287 days.

(21) Appl. No.: 14/024,282

(22) Filed: Sep. 11, 2013

(65) Prior Publication Data
US 2014/0108938 A1    Apr. 17, 2014

Related U.S. Application Data

(63) Continuation of application No. 11/395,166, filed on Apr. 3, 2006, now Pat. No. 8,572,266.

(51) Int. Cl.

| | |
|---|---|
| *H04L 12/24* | (2006.01) |
| *H04L 29/08* | (2006.01) |
| *G06F 3/0482* | (2013.01) |
| *G06F 3/0484* | (2013.01) |
| *H04M 1/725* | (2006.01) |
| *H04W 4/08* | (2009.01) |
| *H04M 1/67* | (2006.01) |
| *H04W 8/18* | (2009.01) |

(52) U.S. Cl.
CPC ............ *H04L 41/22* (2013.01); *G06F 3/0482* (2013.01); *G06F 3/0484* (2013.01); *H04L 67/18* (2013.01); *H04L 67/24* (2013.01); *H04M 1/67* (2013.01); *H04M 1/72572* (2013.01); *H04W 4/08* (2013.01); *H04W 8/18* (2013.01)

(58) Field of Classification Search
CPC ..... G06F 3/0482; G06F 3/0484; H04L 41/22; H04L 67/18; H04L 67/24; H04M 1/72572; H04W 4/08
See application file for complete search history.

(56) References Cited

U.S. PATENT DOCUMENTS

| | | | |
|---|---|---|---|
| 2002/0169539 A1* | 11/2002 | Menard et al. | 701/200 |
| 2004/0221016 A1* | 11/2004 | Hatch et al. | 709/207 |
| 2006/0020904 A1* | 1/2006 | Aaltonen et al. | 715/850 |

* cited by examiner

*Primary Examiner* — Aaron Lowenberger
(74) *Attorney, Agent, or Firm* — Farjami & Farjami LLP

(57) ABSTRACT

Methods and systems are provided for managing a group of portable communication devices. In accordance with one implementation, a computer-implemented method is provided for managing a group of portable communication devices on an individual basis or an aggregate basis, the method comprising the steps of providing a list of the portable communication devices in the group, selecting a target portable communication device, determining the location of the target portable communication device, and presenting the location of the target portable communication device. The method may further comprise the step of determining whether the group has sufficient credit for acquiring the location of the portable communication devices in the group.

8 Claims, 21 Drawing Sheets

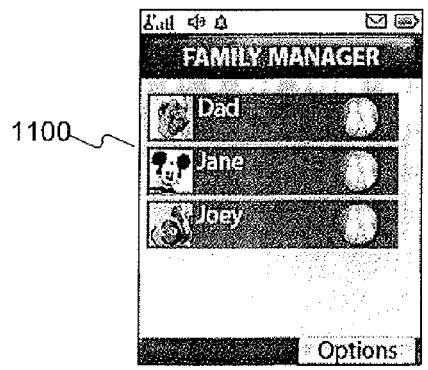
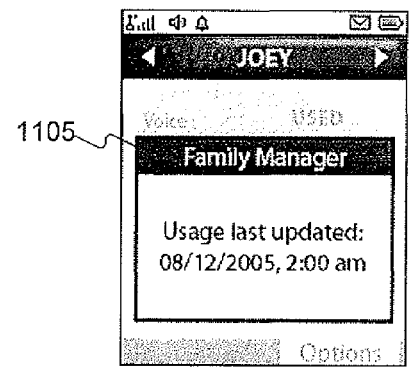
*FIG. 11A*
*FIG. 11B*
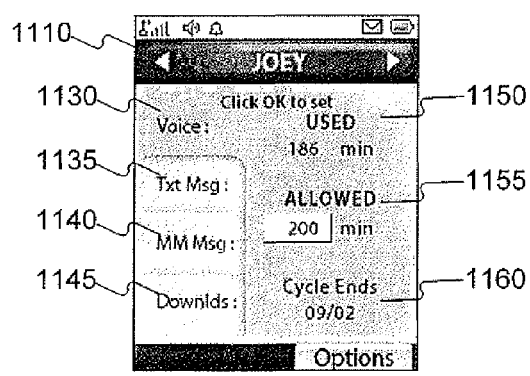
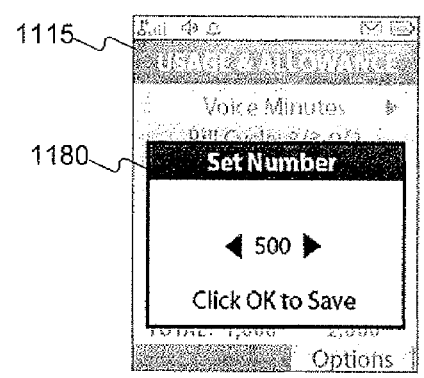
*FIG. 11C*
*FIG. 11D*

| | NOTE ADD THIS TEXT | | | | |
|---|---|---|---|---|---|
| Logo | Restrict Prohibits all phone services excepted for voice calls to whitelisted numbers | | | | |
| | Non-Restrict allows all phone services and usage except for blacklisted number voice calls | | | | |

| | 1410 | | | | |
|---|---|---|---|---|---|
| Family Planner | Joey ▽ | | | | |
| Family Manager | | Today's Date – Monday September 5th | | | 1430 |
| | | Mon  Tue  Wed  Thu | Fri | Sat | Sun |
| Calendar/ Call Control | 12 am – 6 am | Restricted ▽ | | Restricted ▽ | Restricted ▽ |
| | 6 am – 8 am | Non-Restricted ▽ | | Restricted ▽ | Restricted ▽ |
| | 8 am – 10 am | Non-Restricted ▽ | | Non-Restricted ▽ | Restricted ▽ |
| Family Finder | 10 am – 12 pm | Non-Restricted ▽ | | Non-Restricted ▽ | Restricted ▽ |
| | 12 pm – 2 pm | Non-Restricted ▽ | | Non-Restricted ▽ | Non-Restricted ▽ |
| Family Messenger | 2 pm – 4 pm | Non-Restricted ▽ | | Non-Restricted ▽ | Non-Restricted ▽ |
| Photo Share | 4 pm – 6 pm | Non-Restricted ▽ | | Non-Restricted ▽ | Non-Restricted ▽ |
| | 6 pm – 8 pm | Restricted ▽ | | Non-Restricted ▽ | Restricted ▽ |
| | 8 pm – 10 pm | Restricted ▽ | | Non-Restricted ▽ | Restricted ▽ |
| 1420— | 10 pm – 12 am | Restricted ▽ | | Restricted ▽ | Restricted ▽ |

Once you have completed setting Joey's Usage Calendar Click (Save)—1440

Once you have completed setting Joey's Call Control Click (Save)—1445

1450—Call Control – R     1455
Joey cannot call these numbers

1480—Call Control – A     1485
Joey can always call these numbers even when his call time is restricted

| Name | Number | |
|---|---|---|
| Jargo Grobar | 555.678.8989 | ADD |
| Fred Smith | 555.678.8989 | Delete |
| Rod Egdorf | 555.678.8989 | Delete |
| Jeff Domer | 555.678.8989 | Delete |
| Hannibal Lechter | 555.678.8989 | Delete |
| Bob Sled | 555.678.8989 | Delete |
| Phillip Adelphia | 555.678.8989 | Delete |
| Chip Smelz | 555.678.8989 | Delete |
| Dip Janes | 555.678.8989 | Delete |
| Kim Smith | 555.678.8989 | Delete |

| Name | Number | |
|---|---|---|
| | | ADD |
| 911 | 555.678.8989 | Delete |
| Mom Jackson | 555.678.8989 | Delete |
| Dad Jackson | 555.678.8989 | Delete |

1460     1490

User changes family members through pull down      1400

1420— | Joey ▽ |
| Samantha |
| Freddy |

FIG. 14

GROUP MANAGEMENT AND GRAPHICAL USER INTERFACE FOR ASSOCIATED ELECTRONIC DEVICES

This application is a Continuation of U.S. patent application Ser. No. 11/395,166, filed Apr. 3, 2006.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent the or records, but reserves all other copyright rights whatsoever.

TECHNICAL FIELD

This disclosure is related to systems and methods for providing group management and graphical user interfaces for associated electronic devices and, in particular, for providing improved group management, connectivity management, monitoring tools, and graphical user interfaces for associated mobile electronic devices having small-screen electronic displays.

BACKGROUND

As mobile electronic devices, such as cellular telephones, personal digital assistants (PDAs) and pagers, have become more sophisticated, the range of applications that they may offer has become more extensive. Such devices are now often provided with full color, high resolution liquid crystal displays (LCDs) that enable users to view sophisticated graphics, pictures, and video content. Further, new network access protocols, such as the Evolution Data Optimized (EVDO), Wireless Application Protocol (WAP), and i-Mode protocols, allow users to access Internet content through digital cellular networks. Such advances have considerably increased the volume and variety of content available to users of mobile devices. Today, such devices can access much of the same content that was once available only through use of a personal computer connected to the Internet via a land line.

Because mobile devices are easily transportable, and thus accessible by a user in any situation, availability to such a wealth of content on mobile devices benefits the user. The mobile device user may be a member of an organization or a group (e.g., family, company, team), and may carry and use mobile devices carried by other members. Each of the mobile devices may be carried and used by one of the group members, such as supervisory members (e.g., parent, employer, team leader) and supervised members (e.g., child, employee, team member).

A mobile device user now has mechanisms to access the same types of content on her mobile devices as on her personal computers. Furthermore, a mobile device user in a group may also communicate with other members of that group via associated mobile devices at a special rate. However, the traditional approach to connectivity management and group management and coordination is significantly deficient when applied to mobile devices, and conventional mobile device applications are not adapted to manage, coordinate, and monitor mobile devices that are associated in a group.

Accordingly, there is a need for improved mobile device applications and graphical user interfaces for enabling the management, coordination, and monitoring of associated electronic devices.

SUMMARY

Consistent with the present disclosure, a computer-implemented method for managing one or more portable communication devices in a group is provided. The method includes providing a list of the portable communication devices in the group, selecting a target portable communication device, determining the location of the target portable communication device, and presenting the location of the target portable communication device. The method may further comprise the step of determining whether there is at least one unit of credit for acquiring the location of the portable communication devices in the group.

Consistent with another embodiment of the present invention, a system is also provided for locating one or more portable communication devices in a group. The system includes a listing module for providing a list of the portable communication devices in the group, a selection module for selecting a target portable communication device, a locator module for determining the location of the target portable communication device, and a presentation module for presenting the location of the target portable communication device. The system may further contain a credit checking module for determining whether there is at least one unit of credit for acquiring the location of the portable communication devices in the group.

Consistent with the present disclosure, a computer-implemented method for managing one or more portable communication devices in a group is provided. The method includes selecting a portable communication device, providing a permitted list of portable communication devices in the group that are permitted to locate the selected portable communication device, and providing a prohibited list of portable communication devices in the group that are not permitted to locate the selected portable communication device.

Consistent with another embodiment of the present invention, a system is also provided for locating one or more portable communication devices in a group. The system includes a selection module for selecting a portable communication device, a permitted listing module for providing a permitted list of portable communication devices in the group that are permitted to locate the selected portable communication device, and a prohibited listing module for providing a prohibited list of portable communication devices in the group that are not permitted to locate the selected portable communication device.

Consistent with the present disclosure, a computer-implemented method for managing one or more portable communication devices in a group is provided. The method includes providing a list of the portable communication devices in the group, selecting a target portable communication device from the list, and accessing a connectivity information of the target portable communication device, the connectivity information including one or more of a spent connectivity unit counter, a connectivity allowance, and a connectivity allowance reset date. The method may further comprise the step of presenting the connectivity information.

Consistent with another embodiment of the present invention, a system is also provided for locating one or more portable communication devices in a group. The system includes a listing module for providing a list of the portable communication devices in the group, a selection module for selecting a target portable communication device from the list, and a data access module for accessing a connectivity information of the target portable communication device, the connectivity information including one or more of a spent connectivity unit counter, a connectivity allowance, and a connectivity allowance reset date. The system may further contain a presentation module for presenting the connectivity information.

Consistent with the present disclosure, a computer-implemented method for managing one or more portable communication devices in a group is provided. The method includes providing a list of the portable communication devices in the group, selecting a target portable communication device from the list, retrieving a connectivity calendar of the target portable communication device, and presenting the connectivity calendar.

Consistent with another embodiment of the present invention, a system is also provided for locating one or more portable communication devices in a group. The system includes a listing module for providing a list of the portable communication devices in the group, a selection module for selecting a target portable communication device from the list, a retrieval module for retrieving a connectivity calendar of the target portable communication device, and a presentation module for presenting the connectivity calendar.

Consistent with the present disclosure, a computer-implemented method for managing one or more portable communication devices in a group is provided. The method includes providing a list of the portable communication devices in the group, and selecting a target portable communication device from the list. The method may further comprise the steps of retrieving a connectivity whitelist of the target portable communication device, wherein the target portable communication device is permitted to establish communication with a whitelisted communication device identified in the connectivity whitelist and presenting the connectivity whitelist.

Consistent with another embodiment of the present invention, a system is also provided for locating one or more portable communication devices in a group. The system includes a listing module for providing a list of the portable communication devices in the group, a selection module for selecting a target portable communication device from the list, and a retrieval module for retrieving a connectivity whitelist of the target portable communication device, wherein the target portable communication device is permitted to establish communication with a whitelisted communication device identified in the connectivity whitelist. The system may further contain a presentation module for presenting the connectivity whitelist.

Consistent with the present disclosure, a computer-implemented method for managing one or more portable communication devices in a group is provided. The method includes providing a list of the portable communication devices in the group, and selecting a target portable communication device from the list. The method may further comprise the steps of retrieving a connectivity blacklist of the target portable communication device, wherein the target portable communication device is not permitted to establish communication with a blacklisted communication device identified in the connectivity blacklist, and presenting the connectivity blacklist.

Consistent with another embodiment of the present invention, a system is also provided for locating one or more portable communication devices in a group. The system includes a listing module for providing a list of the portable communication devices in the group, a selection module for selecting a target portable communication device from the list, and a retrieval module for retrieving a connectivity blacklist of the target portable communication device, wherein the target portable communication device is permitted to establish communication with a blacklisted communication device identified in the connectivity blacklist. The system may further contain a presentation module for presenting the connectivity blacklist.

Consistent with the present disclosure, a computer-implemented method for managing one or more portable communication devices in a group is provided. The method includes providing a list of the portable communication devices in the group, selecting a target portable communication device from the list, retrieving a connectivity allowance of the target portable communication device, the connectivity allowance including a connectivity calendar, a connectivity whitelist, and a connectivity blacklist, and presenting the connectivity calendar, wherein the connectivity calendar includes a plurality of timeslots and each of the timeslots storing a connectivity flag indicates a connectivity restriction status of the target portable communication device during a time period specified by the timeslot. The method may further comprise the steps of presenting the connectivity whitelist and presenting the connectivity blacklist, wherein the target portable communication device is permitted to establish communication with a whitelisted communication device identified in the connectivity whitelist independent of the connectivity restriction status and the target portable communication device is not permitted to establish communication with a blacklisted communication device identified in the connectivity blacklist independent of the connectivity restriction status.

Consistent with another embodiment of the present invention, a system is also provided for locating one or more portable communication devices in a group. The system includes a listing module for providing a list of the portable communication devices in the group, a selection module for selecting a target portable communication device from the list, and a retrieval module for retrieving a connectivity allowance of the target portable communication device, the connectivity allowance including a connectivity calendar, a connectivity whitelist, and a connectivity blacklist. The system may further contain a calendar module for presenting the connectivity calendar, wherein the connectivity calendar includes a plurality of timeslots, a whitelist module for presenting the connectivity whitelist, and a blacklist module for presenting the connectivity blacklist, wherein the target portable communication device is permitted to establish communication with a whitelisted communication device identified in the connectivity whitelist independent of the connectivity restriction status and the target portable communication device is not permitted to establish communication with a blacklisted communication device identified in the connectivity blacklist independent of the connectivity restriction status.

Additional objects and advantages of the present disclosure will be set forth in part in the description which follows, and in part will be obvious from the description, or may be learned by practice of the embodiments. The objects and advantages of the present disclosure will be realized and attained by means of the elements and combinations particularly pointed out in the appended claims. It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments consistent with the present description and together with the description, serve to explain the principles of the invention.

FIGS. 11A-D show exemplary screen displays for managing the connectivity information of a portable communication device, consistent with the present disclosure;

FIG. 14 shows an exemplary screen display for managing the connectivity allowance of a portable communication device, consistent with the present disclosure.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Figure 1A:
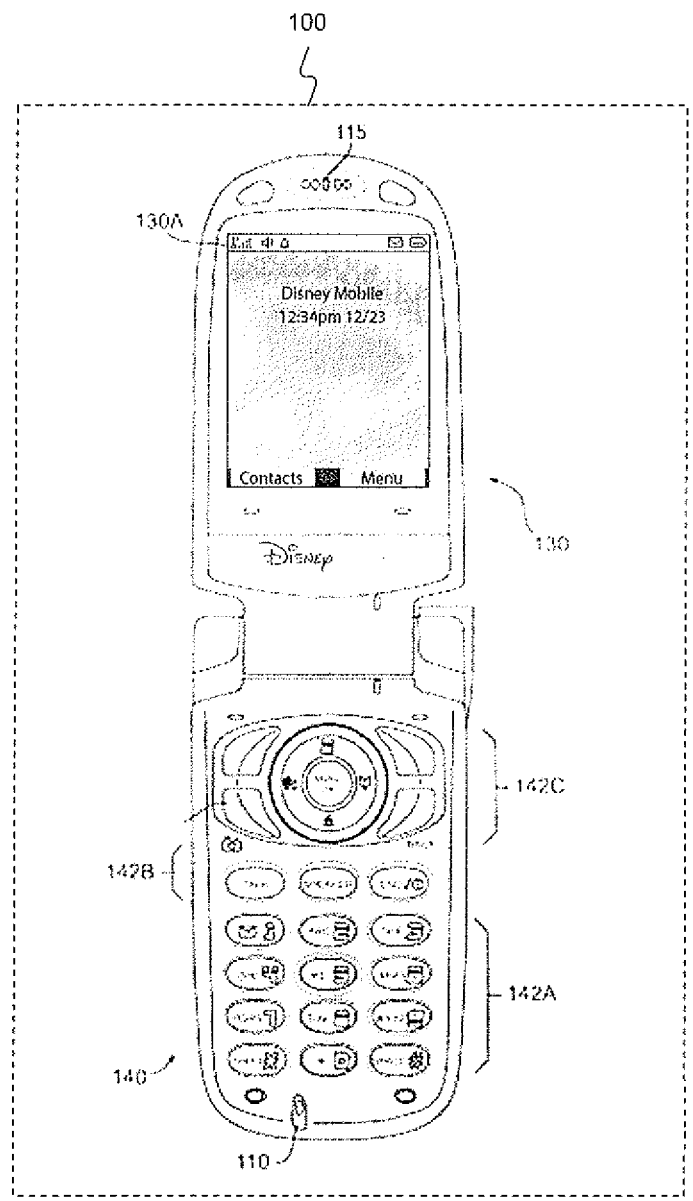
FIGS. 1A-B show external features of an exemplary electronic device, consistent with the present disclosure.
Figure 1B:
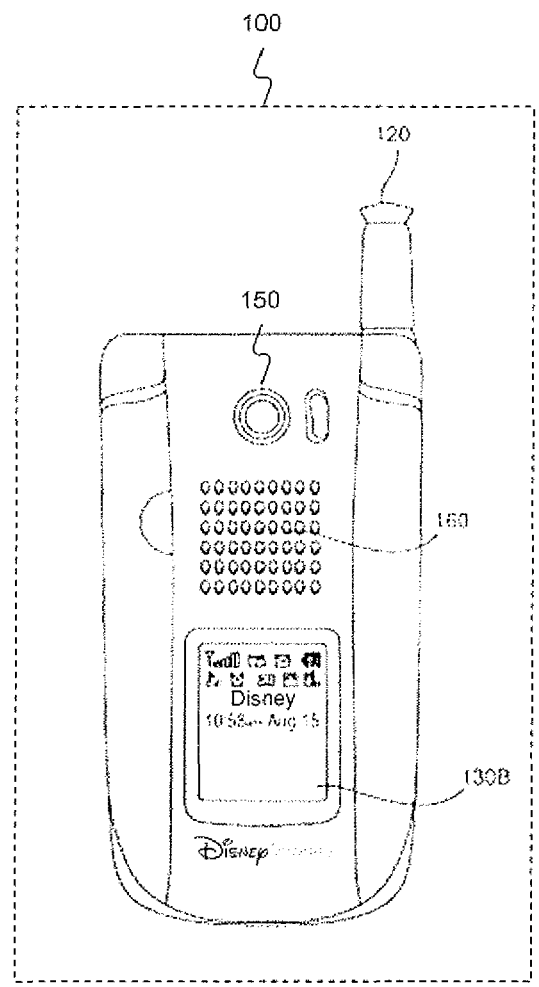

FIGS. 1A-B show external features of an exemplary device 100 consistent with the present disclosure. As shown in FIGS. 1A-B, device 100 may be configured as a foldable, or "clam shell" style, web-enabled mobile telephone (such as the model MM-8300 Multimedia Phone available from Sanyo© North America Corporation) having an open position (FIG. 1A) and a closed position (FIG. 1B). However, it should be noted that systems and methods consistent with the present disclosure may be used with electronic devices configured using different hardware without departing from the scope of the present invention.

For example, systems and methods of the present disclosure may be applied to other mobile electronic devices, such as PDAs, pagers, etc., and to other handheld electronic devices, such as the iPod™ digital music player (available from Apple© Computer, Inc.). Other suitable hardware platforms will be apparent to those skilled in the art. For instance, device 100 may alternatively be configured as a laboratory instrument, television set, or set-top box (such as the TiVo© digital video recorder, available from TiVo© Inc.). Finally, although systems and methods consistent with the present disclosure may be particularly well suited for use with electronic devices having small-screen displays, such systems and methods may also be applied to devices having relatively large screens, such as personal computer and television displays.

As shown in FIG. 1A, exemplary device 100 may include a microphone 110, a speaker 115, a display 130, and an input device 140. As shown FIG. 1B, device 100 may also include an antenna 120, a camera 150 for capturing still or video images, and a speakerphone 160 for hands-free communication.

Display 130 may be any type of graphical display suitable for displaying a graphical user interface consistent with the present disclosure. Display 130 may include a plurality of displays, such as a main display 130A, active when device 100 is in the open position (FIG. 1A), and, in some embodiments, a smaller sub-display 130B, active when device 100 is in the closed position (FIG. 1B). Both main display 130A and sub-display 130B may be implemented using full-color (e.g., 262,144 colors) active matrix LCD displays. However, one skilled in the art will understand that other types of displays (e.g., monochrome displays) may be used.

In exemplary embodiments of the present disclosure, display 130 may be less than five inches in its largest dimension. In particular, as in device 100, both displays 130A and 130B may be less than three inches in their largest dimension. For example, main display 130A may be a 2.1" thin film transistor (TFT) QVGA (240×320 pixels) display, and sub-display 130B may be a 1.1" TFT display. In some embodiments, display 130 may include a touch screen display capable of both outputting information to the user and receiving input from the user. For example, main display 130A of device 100 may be implemented using such a touch screen display.

Input device 140 may be implemented using one or more user input devices adapted for data or command entry. As shown in FIG. 1A, input device 140 may include a keypad adapted for one-handed use. A keypad may include, for example, a 3×4 button alpha-numeric telephone keypad 142A. Alternatively, a keypad may include a full-sized keyboard (such as a "QWERTY" keyboard, not shown). A keypad may also include a plurality of telephone function inputs 142B. As illustrated in FIG. 1A, for example, the keypad may include a TALK (or SEND) key, for initiating telephone communications, a SPEAKER key for actuating speakerphone 160, an END key for ending telephone communications and other applications, as well as a key for actuating camera 150 (denoted in FIG. 1A by a camera icon).

Figure 1C:
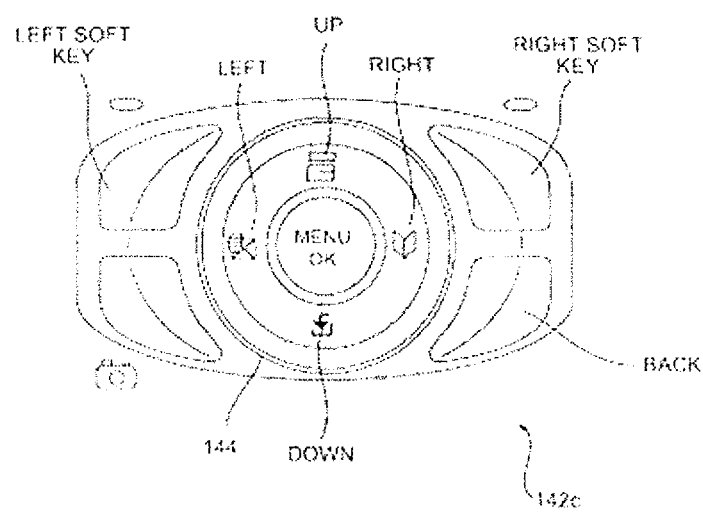
FIG. 1C illustrates a keypad including a plurality of navigation inputs of an exemplary electronic device.

In an exemplary embodiment of the present disclosure, keypad 142 may also include a plurality of navigation inputs 142C. As shown in FIG. 1C, navigation inputs 142C may include a directional input 144 for positioning the cursor. Directional input 144 may include a four-way rocker switch having UP, DOWN, LEFT, and RIGHT directional keys. However, it is to be understood that directional input 144 may be implemented by any suitable technology. For example, directional input 144 may be implemented by discrete buttons, a joystick, touchpad, trackball, or other manual input suitable for cursor navigation, such as the Jog Dial™ actuator available from Sony™ Corporation. Alternatively, display 130A may be configured as a touch screen display, and cursor navigation accomplished by the user touching the surface of the display, e.g., with a finger or stylus. In some embodiments, device 100 may include software to allow cursor navigation by voice command, e.g., via microphone 110.

Further as shown in FIG. 1C, navigation inputs 142C may include a LEFT SOFTKEY, a RIGHT SOFTKEY, and a BACK key. The functions of LEFT SOFTKEY and RIGHT SOFTKEY may vary depending upon the user's location within the application, and the functions at any given point in the application may be dynamically indicated on the display, e.g., by softkey labels 132 at the bottom of main display 130A. As shown in FIG. 1A, for example, LEFT SOFTKEY is labeled "Contacts" and RIGHT SOFTKEY is labeled "Menu."

Navigation inputs 142C may perform different functions in different applications, and may perform different functions at different points within a single application. The functions of navigation inputs 142C within the exemplary graphical user interface is described below in relation to other figures.

Figure 2:
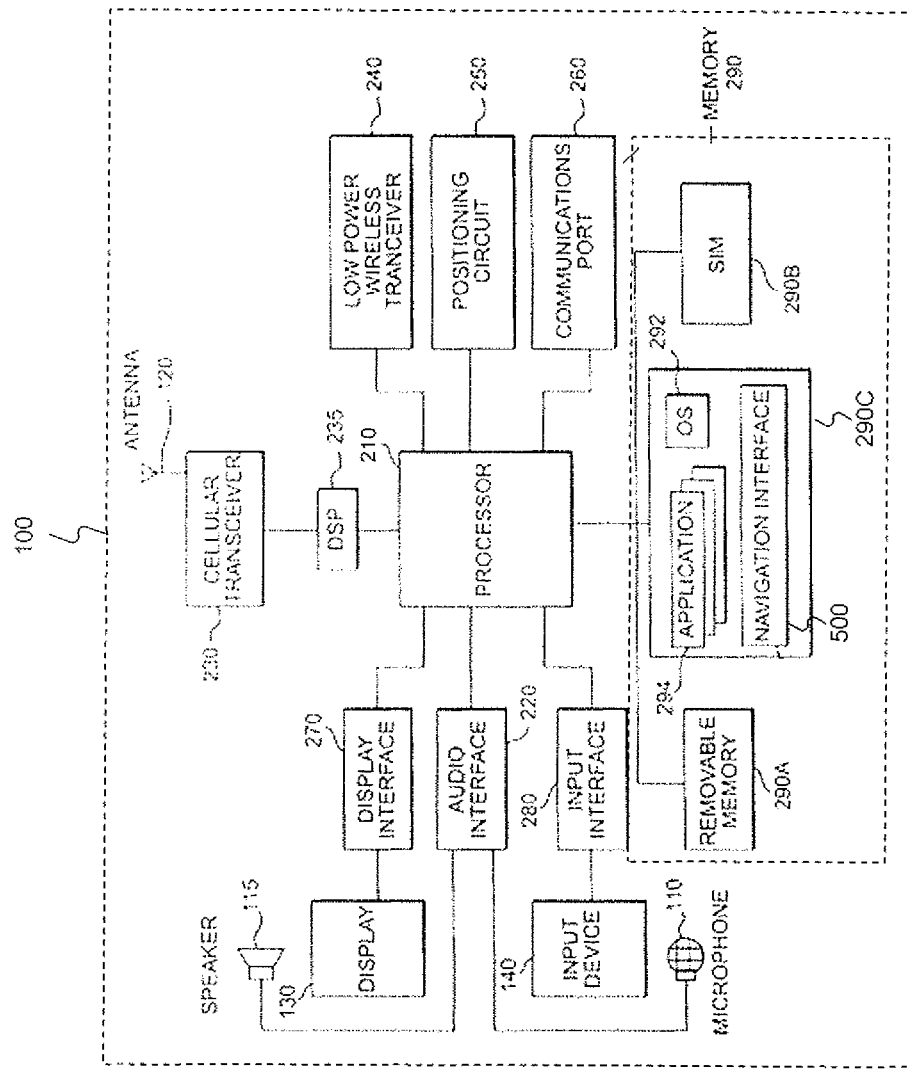
FIG. 2 is a functional block diagram of an exemplary electronic device.

FIG. 2 is a functional block diagram of an electronic device consistent with the present disclosure, such as exemplary device 100. As shown in FIG. 2, exemplary device 100 may include a processor 210, an audio interface 220, a cellular transceiver 230, a digital signal processor (DSP) 235, a low-power wireless transceiver 240, a positioning circuit 250, a communications port 260, a display interface 270, an input interface 280, and a memory 290 (collectively referred to as functional components). However, it will be understood by those skilled in the art that exemplary device 100 could be implemented in other functional configurations, and may include other functional components known to those skilled in the art, without departing from the scope of the present disclosure.

Processor 210 may be implemented using a microprocessor or other controller that may be selectively activated or configured by a computer program to perform one or more methods consistent with the present disclosure. As shown in FIG. 2, processor 210 may be operatively coupled to control functional components 220-280, as described below.

Audio interface 220 may include appropriate drivers for driving microphone 110, speaker 115, and/or speakerphone 160 for use in voice communications. In some embodiments, processor 210 may include an application to enable voice-activated communication, e.g., voice recognition of commands, through audio interface 220.

Cellular transceiver 230 may be operatively coupled to antenna 120 for transmitting and receiving RF communication signals. For example, cellular transceiver 230 may be implemented using a CDMA, TDMA, and/or GSM compatible transceiver operable to transmit and receive digital and/or analog cellular telephony and/or data signals.

DSP 235 may be operatively coupled to enable communication of digital signals between processor 210 and transceiver 230. DSP 235 may decode or otherwise process digital communication signals received through cellular transceiver 230, as well as encode signals to be transmitted by transceiver 230. For example, DSP may digitally encode an analog voice signal received from audio interface 220.

Low-power wireless transceiver 240 may be operable to enable communications with low-power wireless devices. For example, low-power transceiver 240 may be configured to allow device 100 to communicate with, e.g., headsets, keyboards, printers, etc., using the Bluetooth™, IEEE 802.11, infrared, or other low-power wireless communications protocol.

Positioning circuit 250 may be operable to provide information related to the geographic location of device 100. For example, positioning circuit 250 may receive a plurality of signals provided by, e.g., the Global Positioning System (GPS) or wireless base stations, and calculate the position of device 100, for example, based on triangulation of the signals.

Communications port 260 may provide a wired communication link between processor 210 and another electronic device, such as a personal computer. Communication port 260 may be implemented using any suitable wired communication protocol, such as USB, RS-232, or other standard.

Display interface 270 may include appropriate drivers for driving display 130 to output graphics and/or video displays in accordance with control signals provided by processor 210. Input interface 280 may include an appropriate encoder for encoding input received from input device 140 (e.g., keypad 142) in a form suitable for interpretation by processor 210.

Memory 290 may be implemented using a suitable computer-readable media operatively connected to processor 210. Consistent with the present disclosure, a computer readable medium may be any type of memory, such as read-only memory (ROM), random-access memory (RAM), etc., that is capable of carrying information that may be used to processor 110 to perform methods consistent with the present disclosure. For example, computer readable media may be implemented using physical media (e.g., a punch card), magnetic media (e.g., a magnetic disk or tape), optical media (e.g., an optical disk), a carrier wave (e.g., from a computer network, such as a wireless network or the Internet), etc.

As shown in FIG. 2, memory 290 may include a removable memory 290A and a Subscriber Identity Module (SIM) 290B. Removable memory 290A may include a compact flash memory stick or card (e.g., a miniSD removable memory card), e.g., for storing still picture and/or video taken using camera 150. SIM 290b may be used to identify device 100 to a wireless services provider to allow the user to access subscribed services via device 100. In order to identify the subscriber, SIM 290B may contain an identifier, such as an International Mobile Subscriber Identity (IMSI) number, that is unique to each subscriber.

Consistent with the present disclosure, memory 290 may also include a system memory 290C for storing software and/or data for configuring processor 210 to perform methods consistent with the present disclosure. As shown in FIG. 2, system memory 290C may store an operating system (OS) 292 and one or more software applications 294. Operating system 292 may control the basic operation of functional components 210-290, as well as the initiation and operation of applications 294. For example, operating system 292 may be implemented using the SmartPhone or Symbian operating systems (available from Microsoft® Corporation and Symbian™ PLC, respectively), or some other operating system suitable for the particular configuration of device 100.

Software applications 294 may include one or more programs, which control the operation of functional components 210-290. For example, applications 294 may include applications for sending and/or receiving data, e.g., according to the short messaging service (SMS), enhanced messaging service (EMS), or multimedia messaging service (MMS) protocols, and may also include applications for sending and/or receiving data and/or applications according to, e.g., the EVDO, WAP, or i-Mode mobile device protocols for accessing the Internet.

In particular, applications 294 may include user interfaces 500 and 510 for performing one or more methods consistent with the present disclosure. Exemplary user interface 500 is described below in connection with FIG. 5.

Figure 3:
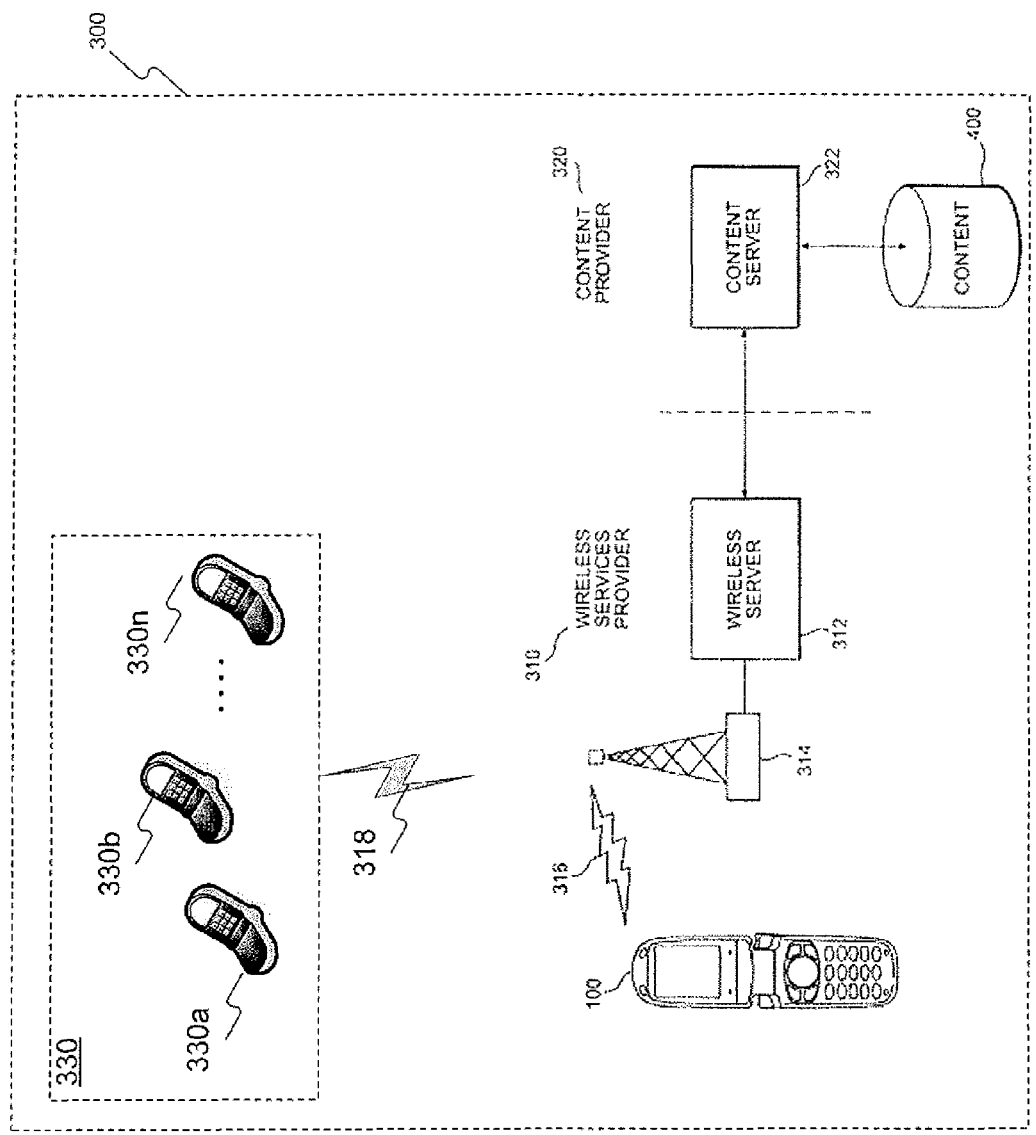
FIG. 3 shows a functional block diagram of an exemplary mobile communications network, consistent with the present disclosure.

FIG. 3 shows a functional block diagram of an exemplary mobile communications network 300 consistent with the present disclosure. As shown in FIG. 3, mobile communications network 300 may include a wireless services provider 310 and a content provider 320.

Wireless services provider 310 may provide cellular telephony or other digital communications services to users of mobile electronic devices, such as device 100. Wireless services provider 310 may be a cellular telephone service provider (such as Sprint Nextel© Corporation), a personal communications services (PCS) provider, or a provider of other wireless services. Wireless services provider 310 may operate a wireless server 312 and a network of base stations 314. As shown in FIG. 3, device 100 may communicate with wireless server 312 using a "client-server" software architecture over a wireless link 316 through base stations 314. Wireless server 312 may also communicate with other electronic devices 330 over a second wireless link 318 through base stations 314. Electronic devices 330 may be any portable communication device, e.g., cellular phones, web-enabled mobile telephone, PDAs, pages. It should be noted that systems and methods consistent with the present disclosure may be used with electronic devices configured using different hardware without departing from the scope of the present invention.

Content provider 320 may be an internet service provider (ISP) or other provider of digital content. Content provider 320 may operate a content server 322 for providing access to digital content 400 stored in computer readable media. Wireless services provider 310 may be linked to content provider 320 through any appropriate communications link 324, such as a WAP gateway, a socket connection, etc.

In an embodiment of the present disclosure, wireless services provider 310 may retrieve digital content from content server 322 over communications link 324 and provide such content to device 100 over wireless link 316. However, it is to be understood that the present disclosure is not limited to such an arrangement, and that device 100 may obtain content 400 by other mechanisms. For example, device 100 may be linked to content provider 320 by a land line and, in some embodiments, some or all of content 400 may be stored in a memory (e.g., system memory 290C) of device 100.

Content 400 provided by content provider 320 may be any type of content, such as news, weather, stock quotes, local content, etc., suitable for access using a mobile electronic device, such as device 100. The content 400 provided by content provider 320 may also be any type of content specific to the user, such as location, subscription parameters, or shared data accessible to electronic devices 100 and 330. In an exemplary embodiment of the present disclosure, the content may be family-related content provided by Disney Mobile™.

Figure 4A:
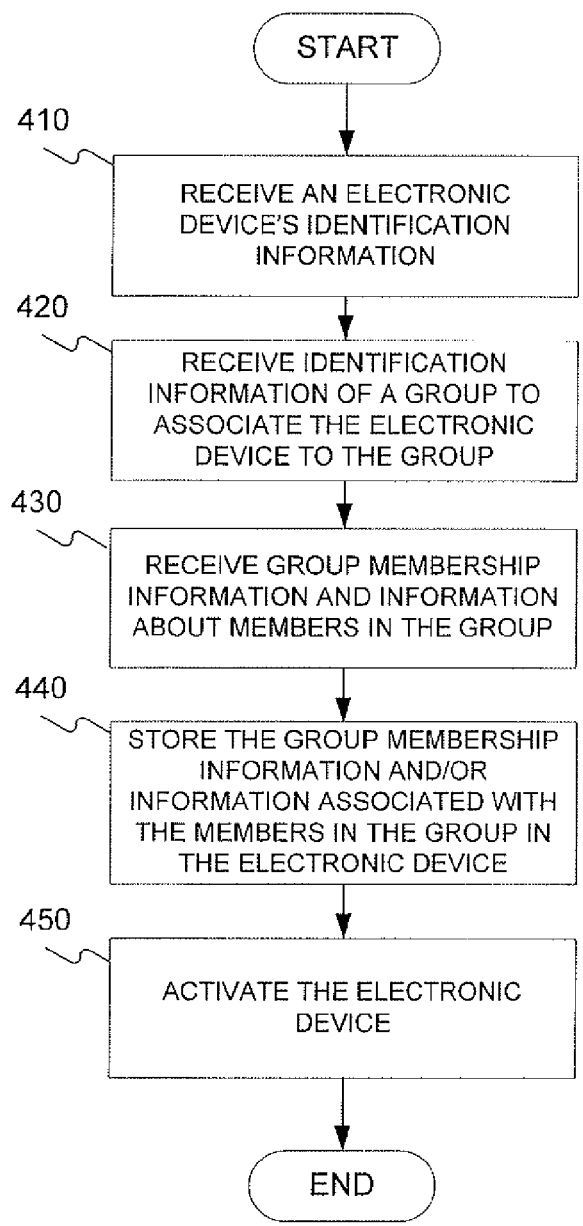
FIG. 4A illustrates a flow diagram of an exemplary method for loading, initiating, and/or customizing group membership information, profiles of group members, and a group-oriented application suite for managing and monitoring a group of portable communication devices.
Figure 15:
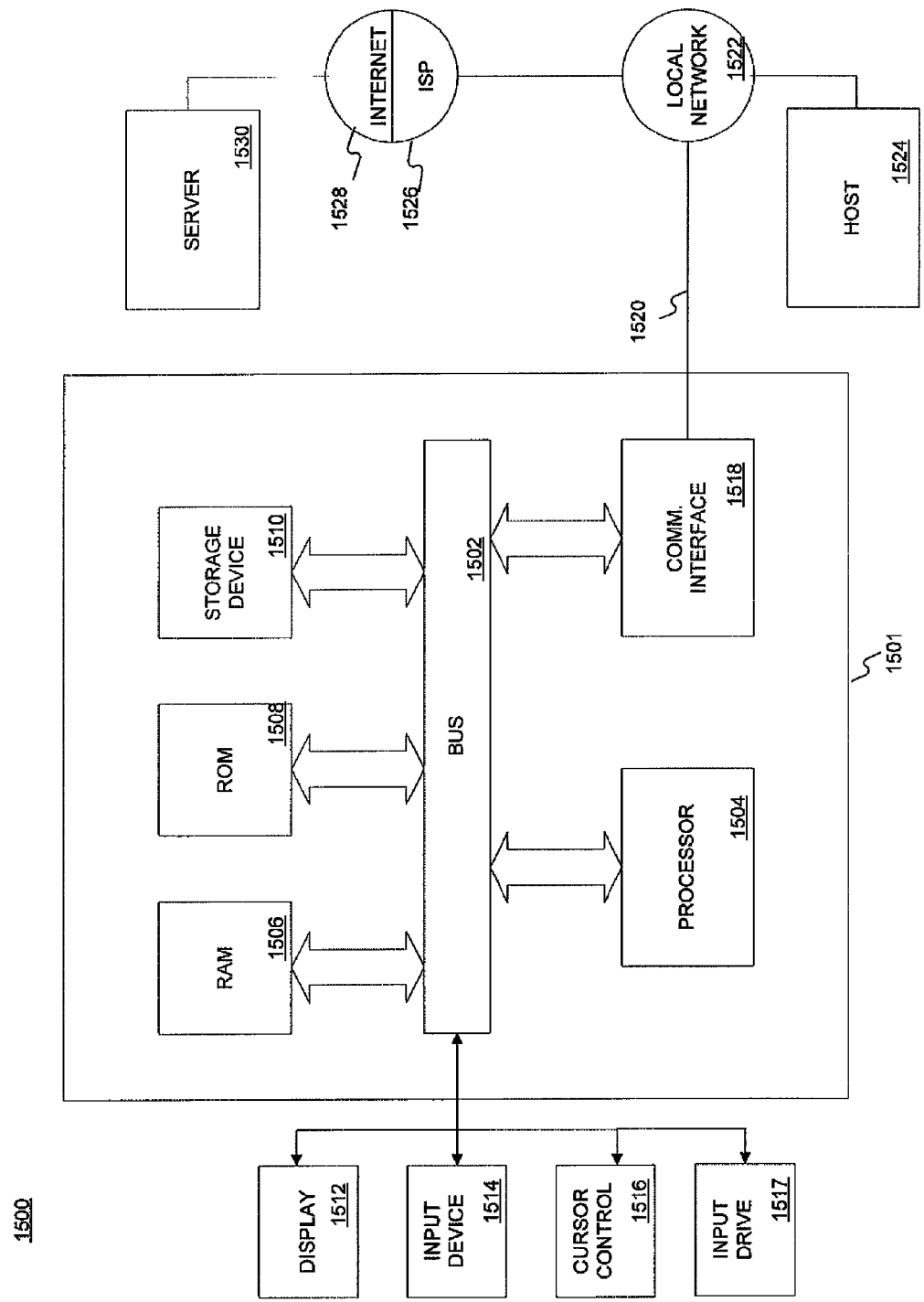
FIG. 15 is a block diagram illustrating a computer system in which an embodiment consistent with the invention may be implemented.

FIG. 4A illustrates a flow diagram of an exemplary method for uploading, initiating, and/or customizing group membership information, profiles of group members, and a group-oriented application suite for managing and monitoring devices (e.g., device 100 and devices 330) that are associated in a group and for providing tools for coordinating and sharing data among the group's devices. Consistent with an embodiment of the invention, an operator of an electronic device provisioning system (e.g., server 1500 as illustrated in FIG. 15) may upload, initialize, and/or customize the group membership information, the profiles of group members, the group-oriented application on device 100 at, for example, the point of sale, the point of activation, or upon request by the purchaser or user of the devices (e.g., device 100 and devices 330).

In stage 410, the operator enters an electronic device's identifier information into the provisioning system. The term "enter" may include manual data entry, bar code scan, upload over a wired or wireless data connection, transmission over a wired or wireless network, download from a data repository or other forms of computer memory, or in any other manner. The operator may enter the identifier information of a group into the provisioning system in stage 420 to associate the electronic device to the group.

In stage 430, the operator may enter group membership information, such as a list of members (e.g., users of devices 330) in the group and the members' roles (e.g., supervisory, basic) in the group. The operator in stage 430 may also enter and/or customize information and profile associated with each member in the group, for example, the member's name, gender, age, contact information (e.g., phone number, electronic mail address, instant messenger identification), access privileges (e.g., supervisory, basic, limited, unlimited), and preferences (e.g., favorite color, preferred theme, preferred ring tones, graphical caller identification).

Next, in stage 440, the operator may store the group membership information and/or information associated with each of the one or more members in the group in a computer memory accessible by device 100 (e.g., content 400, a memory in wireless server 312, memory 290 of device 100). The operator may also load and/or activate one or more applications on device 100 and set up the applications for device 100. Applications include, for example, a member locator for locating one or more of the electronic devices (e.g., devices 330) in the group (as illustrated in FIGS. 8A-D and 9A-C); a group manager for managing a subscription account for the group and connectivity information, connectivity allowance, and connectivity restriction of the electronic devices in the group (as illustrated in FIGS. 11A-D, 12A-C, and 14); a meal planner for managing and organizing meals for the group; a group planner for organizing and coordinating group-related activities; a group messenger for sending and receiving messages among the group members; an appointment reminder for tracking appointments of the group members; a storefront application for purchasing features, utilities, and additional applications; and a data sharing application for sharing data with group members. Then, in stage 450, the operator may activate device 100 to use one or more services (e.g., wireless services provided by wireless services provider 310), if not already activated.

The exemplary method illustrated in FIG. 4A minimizes the amount of data entry required of the devices' purchaser or user, which may facilitate and promote the sale of the devices and services associated with the devices. Moreover, the exemplary method facilitates group-related communications and activities by providing the user with convenient means for contacting group members and managing group-related information, for instance, by prioritizing the group members' contact information in a contact list stored in device 100, by providing tools for communicating with group members (e.g., tools that allow the user to send a new or pre-recorded voice or text message to one or more selected group members), by providing tools for managing the contact list, or other similar ways. The exemplary method may also provide the user with means to access and manage device 100 and membership information associated with the user, for instance, by providing tools that allow the user to view and/or edit the member profile (e.g., name, preferred nickname, preferred ring tone, preferred graphical caller identification), locate and/or apply a theme (e.g., background color, wallpaper, font style, font color, ring tone) for device 100, view the connectivity usage (e.g., user interface 560 as illustrated in FIG. 5B), or set connectivity usage alerts based on allowed usage and actual usage.

Figure 4B:
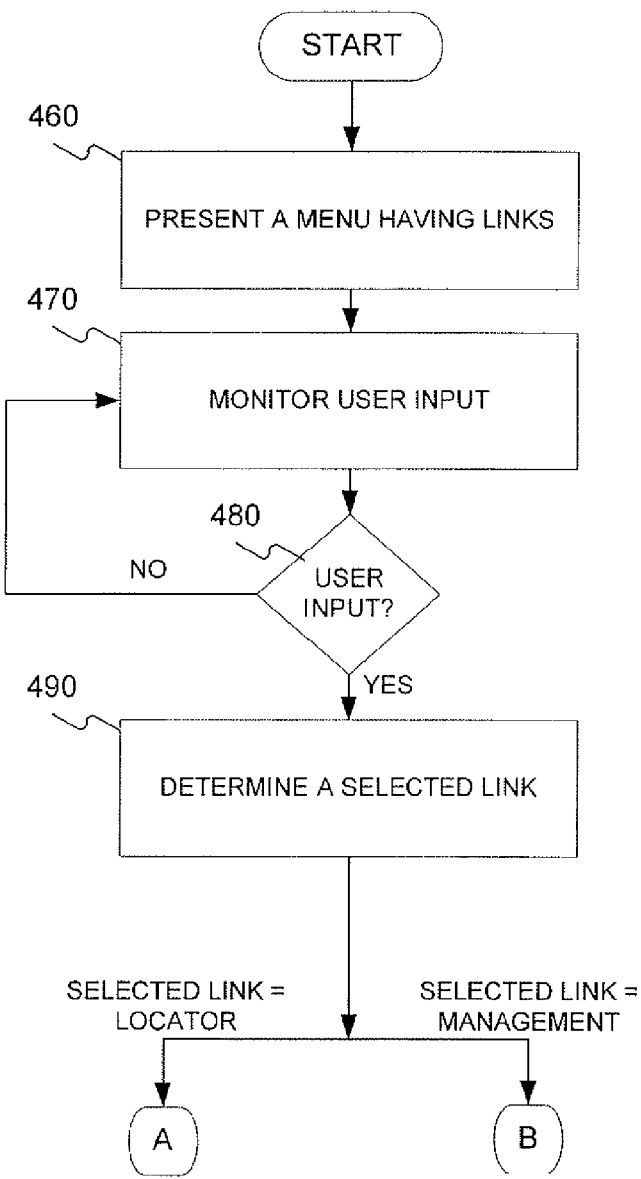
FIG. 4B shows a flow diagram of an exemplary method for initiating and selecting a group management application suite for managing a group of portable communication devices.
Figure 5:
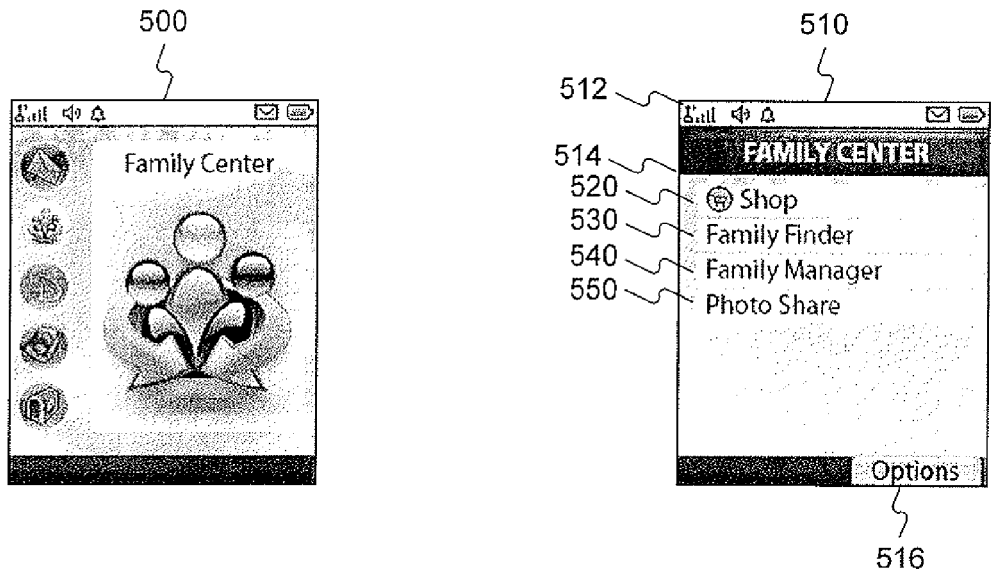
FIG. 5 shows a plurality of exemplary screen displays for initiating the group management application suite, consistent with the present disclosure.

FIG. 4B illustrates a flow diagram of an exemplary method for initiating and selecting a group management application suite for managing a group of portable communication devices. Consistent with an embodiment of the invention, a user (e.g., an operator of device 100) may select and initiate a group management application through graphical user interfaces. In stage 460, device 100 presents to the user a list of links (e.g., links 520-550, as illustrated in FIG. 5), comprising access links to group management applications. In stage 470, device 100 monitors input from the user via, for example, operation of keypad 142, voice command received by, e.g., microphone 110, RF communication signals received by, e.g., antenna 120, and/or operation of display 130 (e.g., a touch-screen). Next, in stage 480, if device 100 detects no user input, the method returns to stage 470 to continue monitoring user input. However, if device 100 detects input from the user, in stage 490 device 100 determines a selected link (e.g., links 530 and 540).

As shown in the exemplary list of graphical user interface 510, the user may initiate a locator application by selecting link 530. When the user selects link 530, device 100 proceeds to either stage 600 (shown in FIG. 6) to allow the user to locate devices 330 or stage 700 (shown in FIG. 7) to allow the user to set and/or modify the parameters of the locator application. The user may also initiate a group management application for managing devices 330 by selecting link 540. When the user selects link 540, device 100 proceeds to either stage 1000 (shown in FIG. 10) or stage 1300 (shown in FIG. 13) to allow the user to manage devices 330. Moreover, the user may initiate a data (e.g., photos) sharing application for sharing data with devices 330 by selecting link 550

Figure 8A:
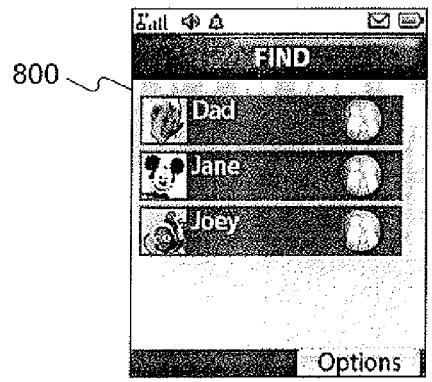
FIGS. 8A-D show exemplary screen displays for locating a portable communication device, consistent with the present disclosure.

FIG. 5 shows a plurality of screen displays of exemplary user interfaces 500 and 510 for accessing content 400. As shown in FIG. 5, screen display 510 may include a status portion 512, a content portion 514, and an options portion 516. Status portion 512 may be used to indicate the status of components or applications of device 100. For example, status portion 512 may display icons and/or text indicative of current cellular signal strength and/or battery power, a message waiting indicator, and the like. Content portion 514 may be used to present application links 520-550 and/or display application content pages, such as exemplary content pages shown in FIGS. 8A-D, 9A-C, 11A-D, 12A-C, and 14. Options portion 516 may be used to present to the user additional options specific to each application, such as locator options 820 as illustrated in FIG. 8C. Options portion 516 may be initiated, for example, via RIGHT SOFTKEY as shown in FIG. 1C.

In an exemplary embodiment of the present disclosure, the positions and dimensions of screen portions 512, 514, and 516 may be persistent throughout navigation interface. That is, the status, content, and options portions 512, 514, and 516 may maintain positions and dimensions on display 130A, regardless of the location or phase of the applications.

In some embodiments of the present disclosure, navigation interface 500 may be configured to be selectively invoked by the user. In such an embodiment, OS 292 may invoke user interface 500 upon entry of an appropriate command by the user. In an exemplary embodiment of the present disclosure, for example, user interface 500 may be selectively invoked by entering an UP directional input from an idle screen of OS 292. In an alternative embodiment, navigation interface 500 may be invoked automatically by OS 292 on startup of device 100. For example, OS 292 may be configured to invoke navigation interface 500 as the default graphical user interface for device 100.

Upon invocation, user interface 510 may obtain frequently used data or content from content provider 320. For example, user interface 510 may establish a wireless link 316 with wireless server 312 in order to obtain certain data from content server 322 via wireless link 316. In an exemplary embodiment of the present disclosure, for instance, user interface 510 may send a query to content server 322 via wireless link 316. In the query, navigation interface may pass an identifier to content server 322. For example, the identifier may be an IMSI number stored on SIM 290B; however, any identifier sufficient to identify the query as coming from a subscriber may be used.

Content server 322 may then determine whether the identifier corresponds to a subscriber to the applications, and, if so, the subscriber's level of access (e.g., whether the subscriber has supervisory or basic access). If content server 322 determines that the identifier does not correspond to a subscriber, then content server 322 may deny access to application content 400. Conversely, if content server 322 determines that the identifier corresponds to a subscriber of the applications, then content server 322 may reply by transmitting certain startup content to device 100.

In order to allow user interface 510 to quickly present frequently used content to the user, for example, content server 322 may transmit data necessary for the display of a startup content page and/or frequently accessed content in response to the initial query. In the exemplary Disney Mobile™ applications, for example, content server 322 may transmit the latest version of a startup content page as well as other time sensitive content necessary for the display of frequently used content pages, such as subscribers associated with electronic devices 330. Upon receiving the startup content, user interfaces (e.g., user interfaces 500-510) may save a copy of such content, e.g., in a RAM portion of system memory 290C. User interfaces (e.g., user interfaces 800 and 1100 in FIGS. 8 and 11, respectively) may then may use the startup content to display application startup screens.

User interface 510 may then search for the requested content page in system memory 290C. If the requested content page is not found within system memory 290C, then navigation interface may request the page from content server 322, as described above. Upon retrieving the requested page from either system memory 290C or content server 322, device 100 may display the startup page (e.g., user interfaces 800 and 1100) for the requested application.

User interfaces may also provide an "Option" input for enabling the user to retrieve or modify application options and/or parameters. In the exemplary embodiment, for example, this function may be assigned to the RIGHT SOFTKEY (as denoted in FIG. 1C). The function performed by the option input may vary based upon the state of the content portion. If content portion is displaying the locator application, then, upon selection of the "Option" input, device 100 may open an options menu that is contextually relevant to the locator application.

Application for Locating Electronic Devices

Figure 6:
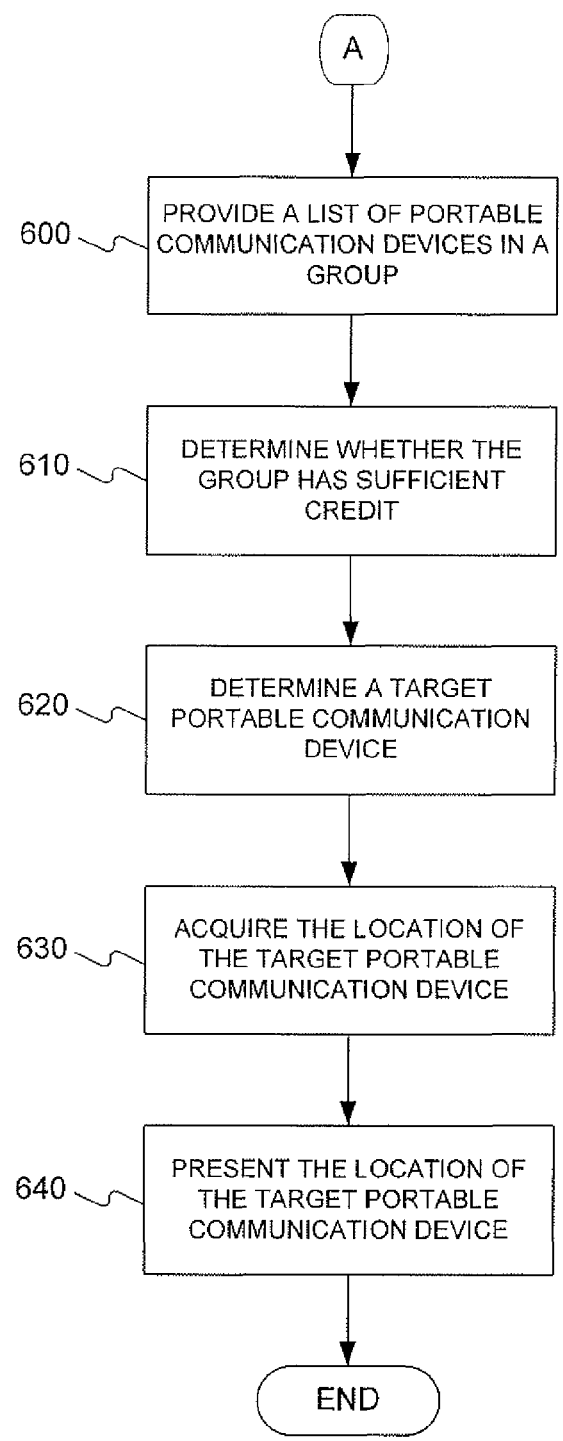
FIG. 6 illustrates a flow diagram of an exemplary method for locating a portable communication device in a group.
Figure 7:
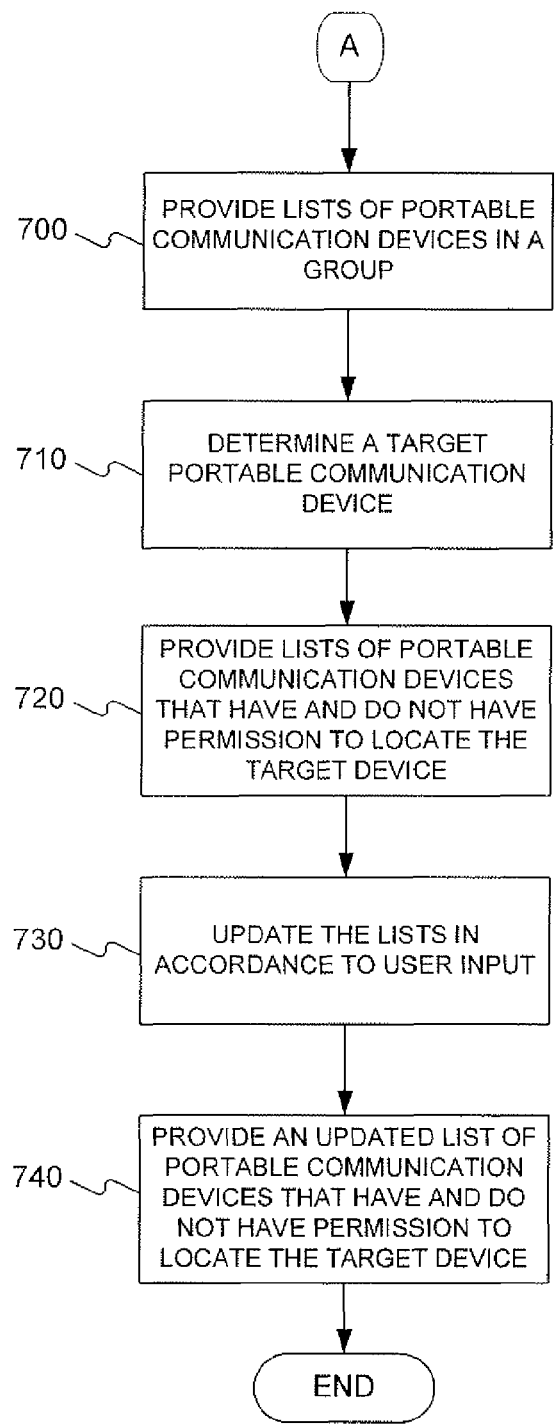
FIG. 7 illustrates a flow diagram of an exemplary method for setting the parameters of the application for locating a portable communication device.

The operation of exemplary user interfaces 800-830 (shown in FIGS. 8A-8D) will now be described with reference to FIG. 6. FIG. 6 illustrates a flow diagram of an exemplary method for locating a portable communication device in a group of electronic devices (e.g., electronic devices 330) associated with device 100. In stage 600, device 100 may retrieve a list of trackable electronic devices in a group from system memory 290C. The list of trackable electronic devices may depend on the right of the user associated with device 100. For example, if the user associated with device 100 has no supervisory or administrative rights, the list of trackable electronic devices may be empty or limited to electronic devices that the user is permitted to locate (see, e.g., FIGS. 7 and 9A-C). Furthermore, device 100 may require the user to enter a password (e.g., personal identification number) prior to initiating the application for locating electronic devices and/or displaying the list of trackable electronic devices. If the requested list is not found within system memory 290C, then device 100 may request the page from content server 322. Upon retrieving the list from system memory 290C, content server 322, or any other source, device 100 may display the list of trackable electronic devices (e.g., Dad, Jane, and Joey as shown in FIG. 8A) to the user.

In stage 610, device 100 may determine whether a subscription account associated with the group of electronic devices has sufficient credit for acquiring the location of the electronic devices in the group. If the subscription account has insufficient credit, device 100 may inform the user that the subscription account has insufficient credit and may prevent the user from accessing the locator function in device 100. If the subscription account has insufficient credit, device 100 may also prompt the user to purchase credit. Alternatively, if the subscription account has sufficient credit for acquiring the location of the electronic devices in the group, the locator application proceeds to stage 620 to determine, based on the user's selection, a target electronic device from the group. After the user selects the target electronic device from the group, device 100 may require the user to enter a password prior to acquiring and displaying the location of the target electronic device.

Next, in stage 630, device 100 may acquire the location of the target electronic device by sending a request to wireless services provider 310. Wireless services provider 310 may acquire or determine the location of the target electronic device via positioning systems, including, for example, satellite navigation systems (e.g., the Global Positioning System) and signal tracking systems (e.g., cellular signal triangulation systems, network-based location systems, the Position Determination Entity, and the like). Upon successful acquisition or determination of the location of the target electronic device, wireless services provider 310 may send the location to device 100 and may deduct one or more units of credits from the subscription account associated with device 100.

Figure 8B:
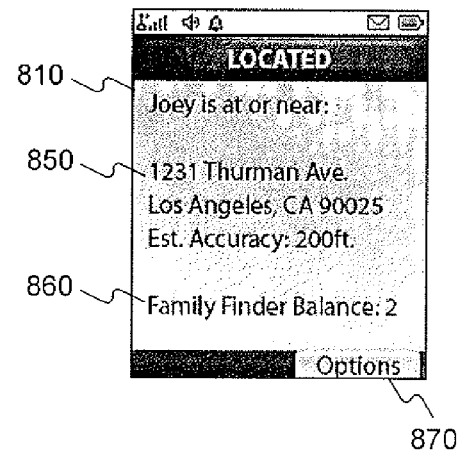
Figure 8C:
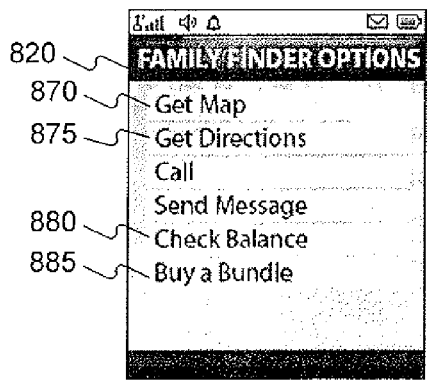
Figure 8D:
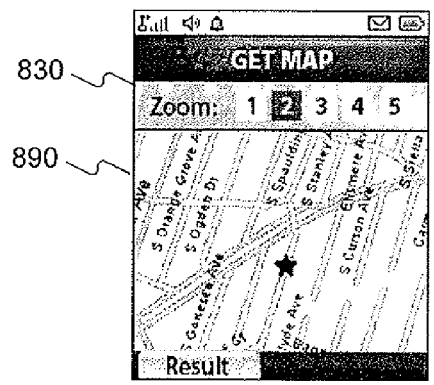

Then, in stage 640, device 100 may display the location (e.g., address 850 as shown in FIG. 8B) through an exemplary user interface 810 to the user. Device 100 may also display the remaining credits available (e.g., balance 860) for acquiring the location of the electronic devices (e.g., electronic devices 330) in the group. Moreover, if the user selects option function 870 (e.g., by operating the RIGHT SOFTKEY as denoted in FIG. 1C), device 100 may display user interface 810 to enable the user to access additional options (e.g., options 870-885 as shown in FIG. 7C) of the locator application. If the user selects a "Get Map" option 870, device 100 may provide a pictorial representation (e.g., street map 890) of the location of the target electronic device. If the user selects a "Get Directions" option 875, device 100 may provide driving directions from the location of device 100 to the location of the target electronic device. If the user selects a "Check Balance" option 880, device 100 may display the remaining credits available (e.g., balance 860). If the user selects a "Buy a Bundle" option 885, device 100 may allow the user to purchase one or more units of credit for acquiring the location of the electronic devices in the group.

Figure 9A:
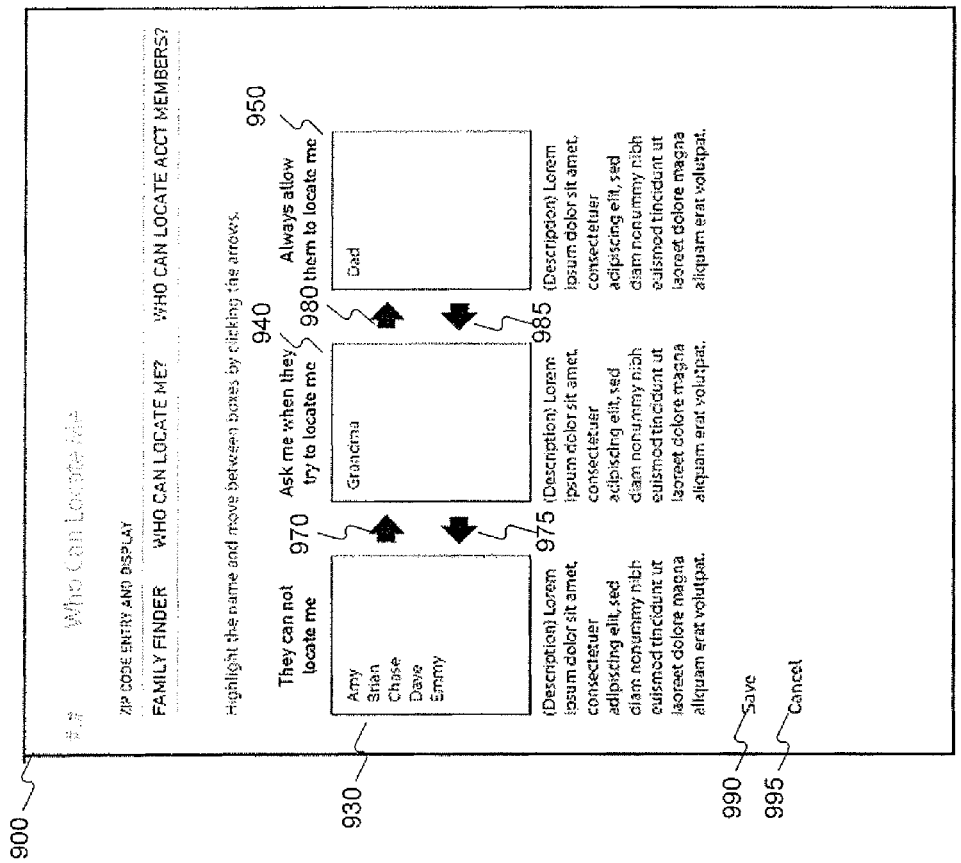
FIGS. 9A-C show exemplary screen displays for setting the parameters of the application for locating a portable communication device, consistent with the present disclosure.
Figures 9B, 9C:
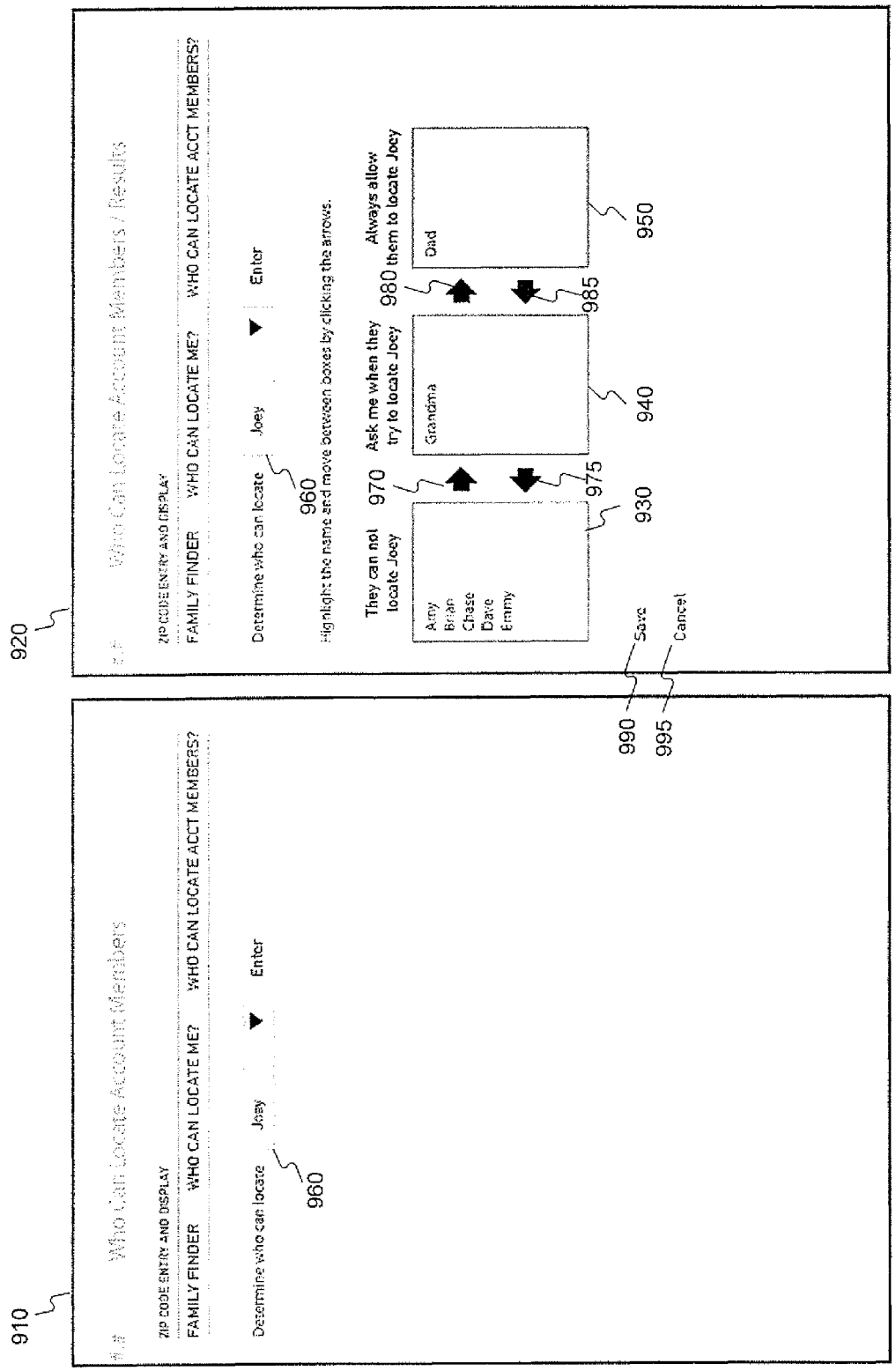

The operation of exemplary user interfaces 900-920 (as shown in FIGS. 9A-9C) will now be described with reference to FIG. 7. FIG. 7 illustrates a flow diagram of an exemplary method for setting the parameters of the application for locating a target electronic device in a group of associated electronic devices (e.g., device 100 and electronic devices 330) by another electronic device in the group. Although FIG. 7 is described in relation to device 100, the exemplary method illustrated in FIG. 7 may also be carried out by the user operating a computer system 1500 (as shown in FIG. 15). In stage 700, device 100 may retrieve a selectable list (e.g., drop-down list 960 as shown in FIG. 9B) of the group of electronic devices from system memory 290C. If the requested list is not found within system memory 290C, then device 100 may request the page from content server 322. Upon retrieving the selectable list from system memory 290C, content server 322, or any other source, device 100 may display the selectable list of the group of electronic devices to the user. Next, in stage 710, device 100 determines a target electronic device based on the user's input.

Then, in stage 720, device 100 may retrieve from system memory 290C, for example, a "prohibited" list 930 of electronic devices prohibited from tracking the target electronic device, a "permissible" list 940 of electronic devices that may track the target electronic device upon additional consent, and a "permitted" list 950 of electronic devices permitted to track the target electronic device. If the requested lists are not found within system memory 290C, then user interface 900 (as shown in FIG. 9A) may request the lists from content server 322. Upon retrieving the lists from system memory 290C, content server 322, or any other source, device 100 may display the lists of the group of electronic devices (e.g., prohibited list 930, permissible list 940, and permitted list 950 as shown in FIGS. 9A and 9C).

In stage 730, device 100 may update the lists of the group of electronic devices in accordance with the user's input. For example, the user may select from prohibited list 930 an electronic device associated with a member (e.g., Amy) of the group, then select operation 970 to transfer the selected electronic device to permissible list 940. Likewise, the user may select from permissible list 940 an electronic device associated with a member (e.g., Grandma) of the group, then select operation 980 to transfer the selected electronic device to permitted list 950. Moreover, the user may select from permitted list 950 an electronic device associated with a member (e.g., Dad) of the group, then select operation 985 to transfer the selected electronic device to permissible list 940. Furthermore, the user may select from permissible list 940 an electronic device associated with a member (e.g., Grandma) of the group, then select operation 975 to transfer the selected electronic device to prohibited list 930. At any point in stage 730, the user may save the updated lists by selecting a "Save" button 990 or cancel any updates by selecting a "Cancel" button 995. Then, in stage 740, device 100 may display the lists, including any user-entered updates.

Application for Managing Electronic Devices

Figure 10:
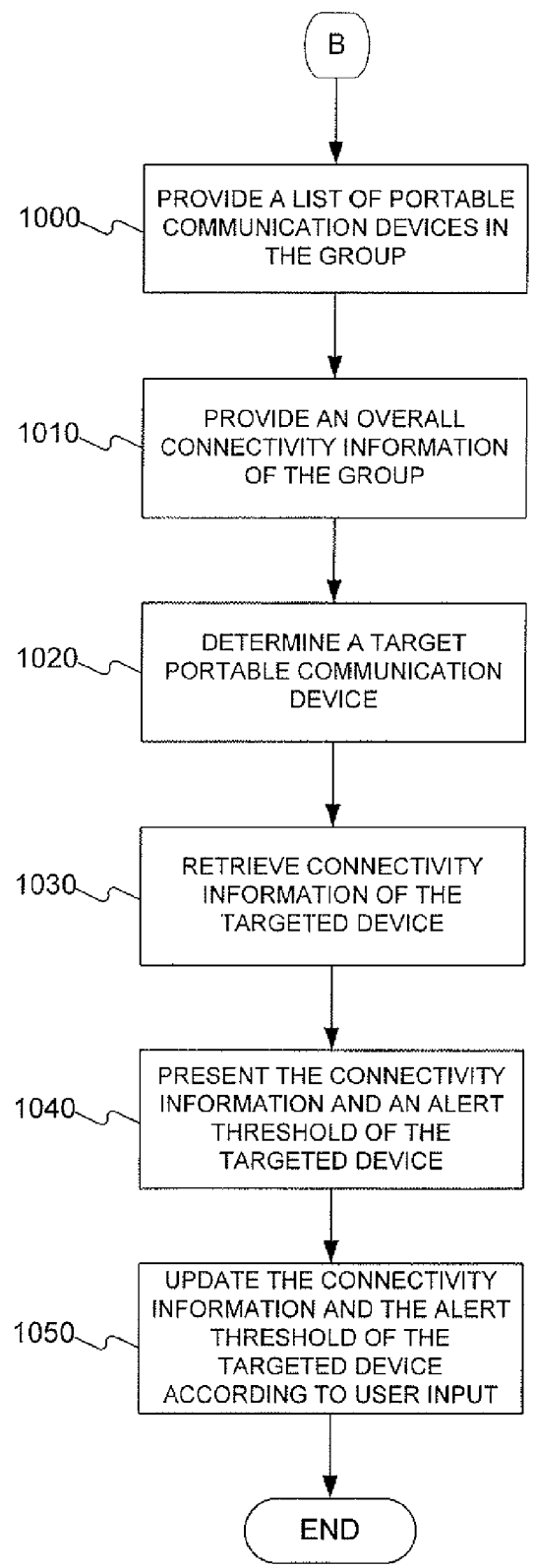
FIG. 10 illustrates a flow diagram of an exemplary method for managing connectivity information of a portable communication device in a group.

The operation of exemplary user interfaces 1100-1115 and detailed user interface 1200 will now be described with reference to FIG. 10. FIG. 10 illustrates a flow diagram of an exemplary method for managing connectivity information and allowance of a portable communication device in a group of electronic devices (e.g., electronic devices 330) associated with device 100. Although FIG. 10 is described in relation to device 100, the exemplary method illustrated in FIG. 10 may also be carried out by the user operating computer system 1500 (as shown in FIG. 15). Depending on the user's administrative rights (e.g., supervisory or basic) of device 100, the group of electronic devices may comprise some or all the electronic devices in the group, or just device 100. In stage 1000, device 100 may retrieve a list of the group of electronic devices from system memory 290C. If the requested list is not found within system memory 290C, then device 100 may request the page from content server 322. Upon retrieving the list from system memory 290C, content server 322, or any other source, device 100 may display the list of the group of electronic devices (e.g., Dad, Jane, and Joey as shown in user interface 1100 of FIG. 11A; Joey, Samantha, Freddy, and Self as shown user interface 1220 of FIG. 12A).

In stage 1010, device 100 may acquire and display overall connectivity information (e.g., usage and allowance) of a subscription account associated with the group of electronic devices. As shown in exemplary status display 1250 in FIGS. 12A-12C, device 100 may display the overall connectivity information for each of a plurality of categories of connectivity services. Connectivity categories 1210 include, for example, voice, text messaging (e.g., SMS, Smart Messaging, EMS, and the like), multimedia messaging (e.g., MMS, EMS, and the like), and content (e.g., data download and data upload).

Figure 12A:
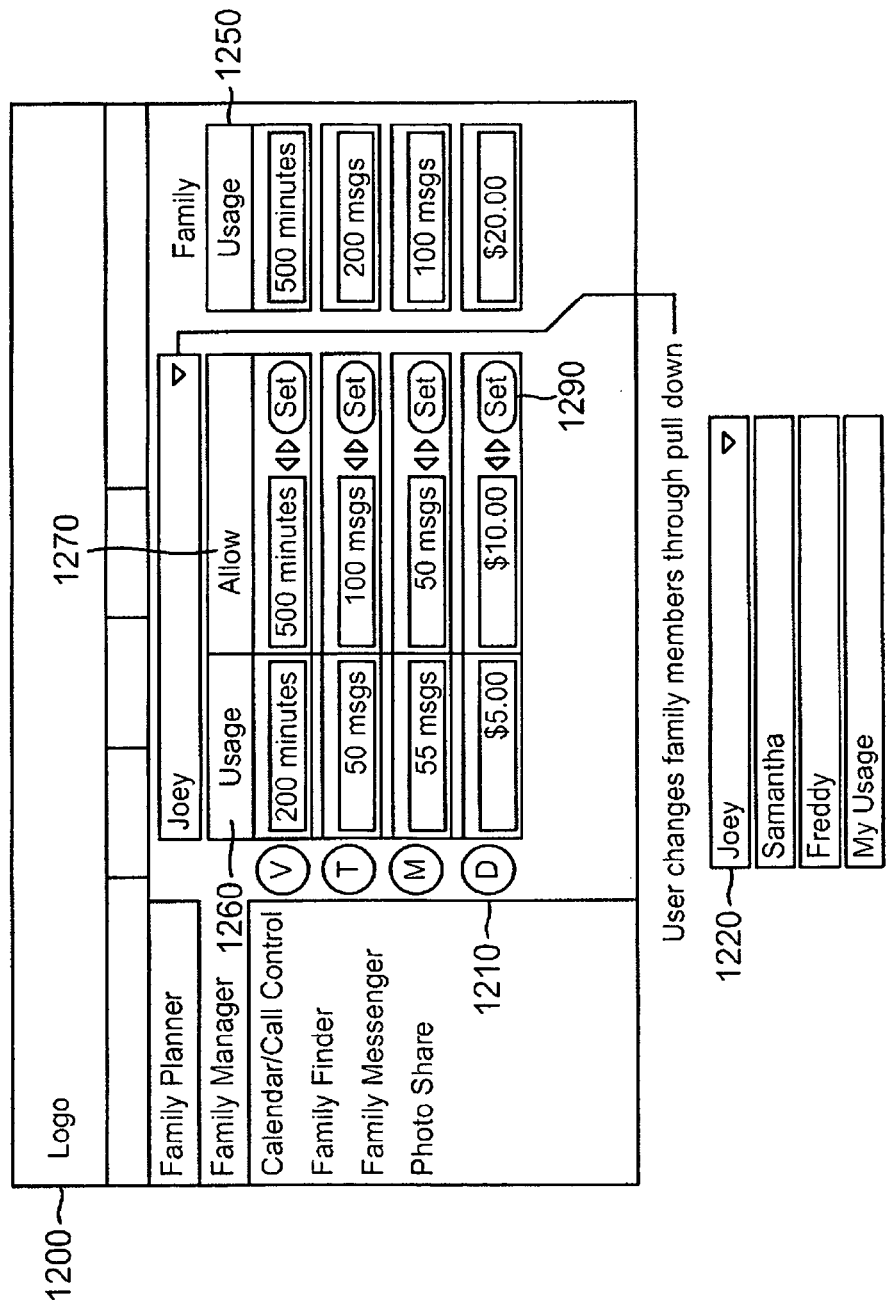
FIGS. 12A-C show additional exemplary screen displays for managing the connectivity information of a portable communication device, consistent with the present disclosure.
Figure 12B:
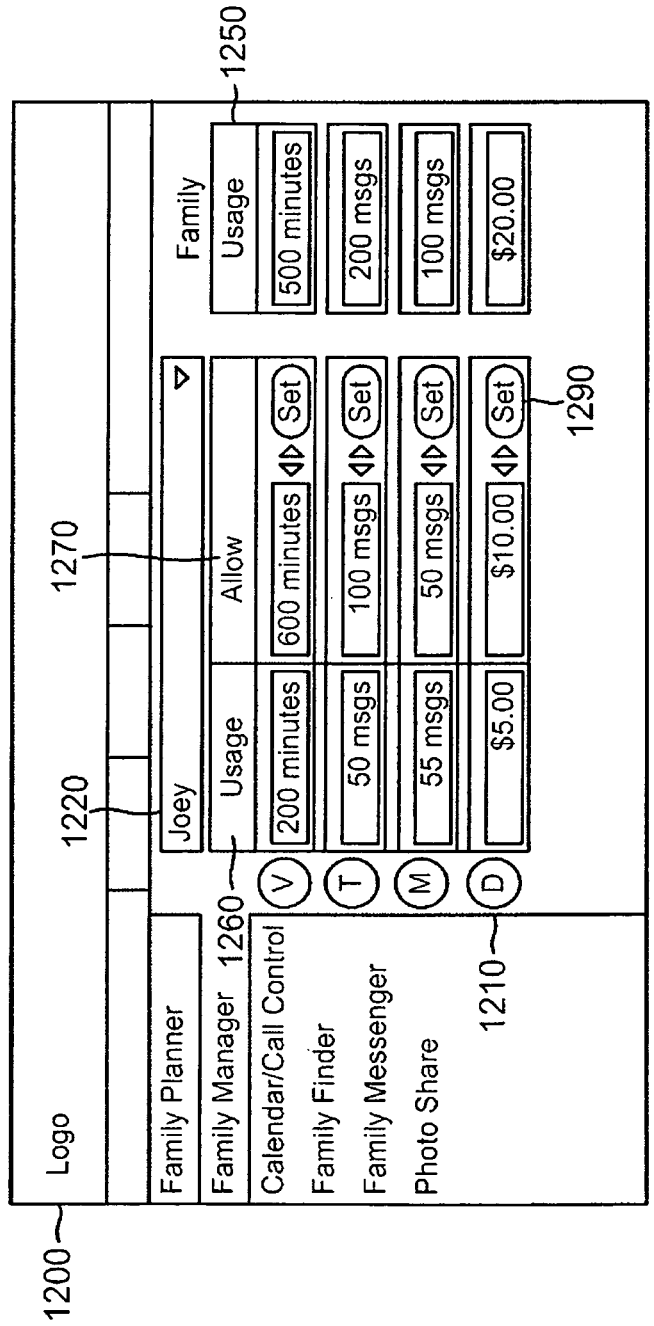

Next, device 100 in stage 1020 may determine, based on the user's selection, a target electronic device from the group. Device 100 may also retrieve from wireless services provider 310 preliminary information associated with the target electronic device and display the preliminary information, such as the last time the connectivity status of target device was modified (see, e.g., user interface 1105 in FIG. 11B). Then, in stage 1030, device 100 may acquire from wireless services provider 310 and display connectivity information (e.g., usage 1150 and 1260, allowance 1155 and 1270, billing cycle 1160 as shown in FIGS. 11C and 12A-B) of the target electronic device in association with the subscription account.

In an embodiment consistent with the present disclosure, wireless services provider 310 may update connectivity usage (e.g., usage 1150 and 1260) of each of the group's electronic devices (e.g., electronic devices 330) on a periodic basis (e.g., once every half hour, once every hour), on an event basis (e.g., powering on the electronic device, powering off the electronic device, initiating a voice call, terminating a voice call, sending a message, receiving a message, initiating a data download, completing a data download, and the like), and/or substantially in real-time, which may provide for more accurate monitoring and tracking of the group's electronic devices' connectivity usage and provide more timely spending alerts to the user. Furthermore, wireless service provider 310 may offer rebates, rewards, gifts, and/or other incentives to a user of an electronic device in the group based on the electronic device's connectivity usage and/or the subscription account associated with the group based on the group's electronic devices' connectivity usage.

In stage 1040, device 100 may display the connectivity information of the target electronic device in association with the subscription account. As shown in exemplary user interface 1110 in FIG. 11C, device 100 may display the connectivity information for the target electronic device separated into a plurality of categories of connectivity services. Connectivity categories include, for example, voice 1130, text messaging 1135 (e.g., SMS, Smart Messaging, EMS, and the like), multimedia messaging 1140 (e.g., MMS, EMS, and the like), and content 1145 (e.g., data download and data upload). Device 100 may also display a spending threshold to the user, in which a spending alert is sent to the user when the target electronic device's connectivity usage reaches the spending threshold, such as when the connectivity usage reaches a percentage (e.g., 80%, 100%) of the connectivity allowance.

Figure 12C:
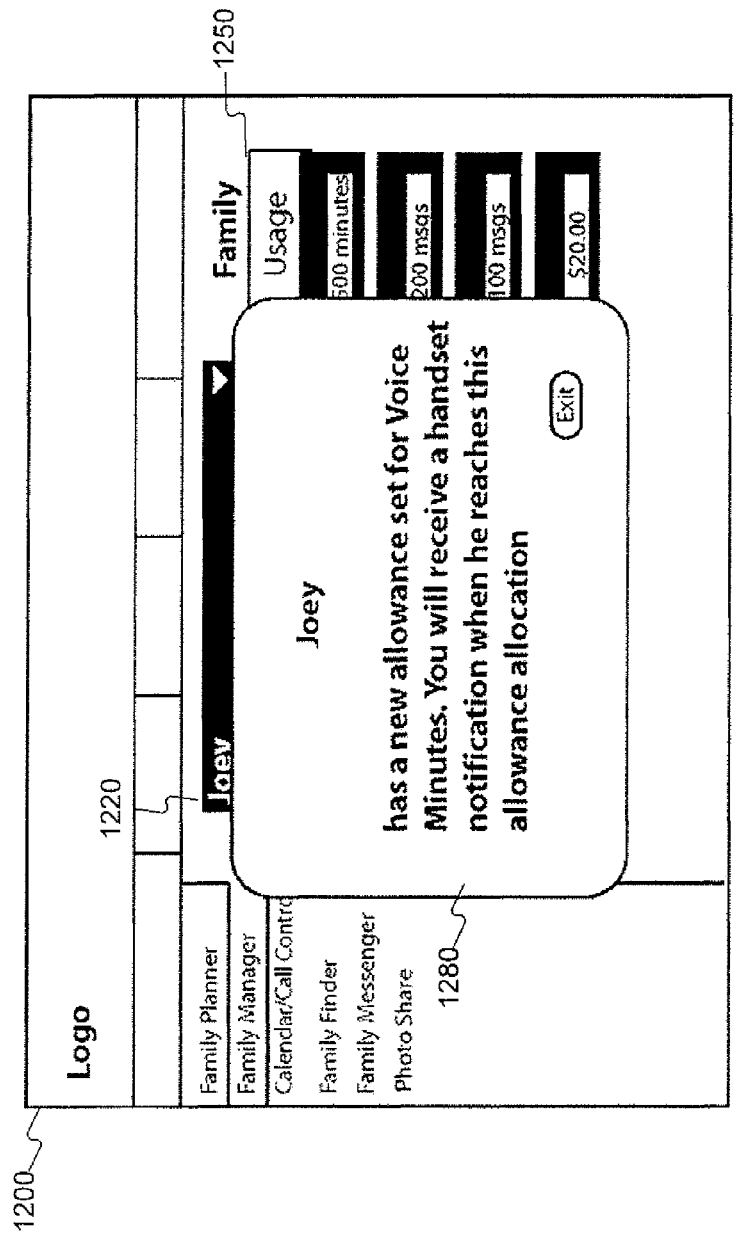

Next, in stage 1040, the user may opt-in or opt-out of receiving the spending alert. After the user views and/or modifies the spending threshold and alert status, device 100 provides a status update 1280 (as shown in FIG. 12C) to inform the user of the spending alert status and spending threshold.

Also, in stage 1050, device 100 may update the connectivity allowance of the target electronic device in accordance with the user's input. For example, the user may select a connectivity category (e.g., voice 1130, text message 1135, multimedia message 1140, content downloads 1145, voice mail, and other types of connectivity services), then modify (e.g., increase, decrease, initiate by increasing from zero, and terminate by setting to zero) the connectivity allowance for the selected connectivity category via an update panel (e.g., update panels 1180 and 1210 as shown in FIGS. 11D and 12A-12B, respectively). At any point in stage 1040, the user may save the updated connectivity allowance by, for example, operating the OK key (as shown in FIG. 1C) or selecting a "Set" button 1290, or cancel any updates by operating the BACK key (as shown in FIG. 1C) or selecting a "Cancel" button.

Figure 13:
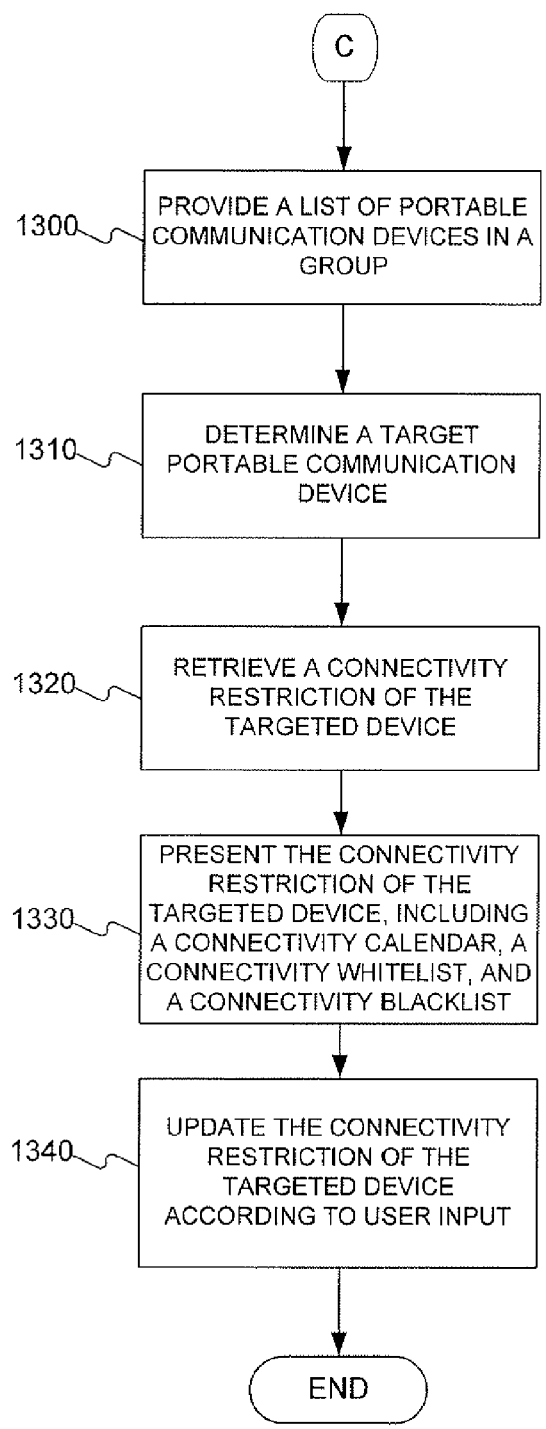
FIG. 13 illustrates a flow diagram of an exemplary method for managing connectivity restriction of a portable communication device in a group.

The operation of an exemplary user interface 1400 will now be described with reference to FIG. 13. FIG. 13 illustrates a flow diagram of an exemplary method for managing connectivity restriction of a portable communication device in a group of electronic devices (e.g., electronic devices 330) associated with device 100. Although FIG. 13 is described in relation to device 100, the exemplary method illustrated in FIG. 13 may also be carried out by the user operating computer system 1500 (as shown in FIG. 15). Depending on the user's administrative rights (e.g., supervisory or basic) of device 100, the group of electronic devices may comprise some or all the electronic devices in the group, just device 100, or no device. If the user associated with device 100 has no supervisory or administrative rights, the user may be prevented from initiating the connectivity restriction functionality and/or modifying the connectivity restriction. In stage 1300, device 100 may retrieve a list of the group of electronic devices from system memory 290C. If the requested list is not found within system memory 290C, then device 100 may request the list from content server 322. Upon retrieving the list from system memory 290C, content server 322, or another source, device 100 may display the list of the group of electronic devices (e.g., Joey, Samantha, and Freddy as shown in a drop-down list 1420 of FIG. 14).

Next, device 100 in stage 1310 may determine, based on the user's selection, a target electronic device from the group. Then, in stage 1320, device 100 may acquire the connectivity restriction (e.g., connectivity calendar 1410, connectivity blacklist 1450, and connectivity whitelist 1480 as shown in FIG. 14) of the target electronic device in association with the subscription account.

In stage 1330, device 100 may display the connectivity restriction of the target electronic device in association with the subscription account. As shown in exemplary user interface 1400, device 100 may display the connectivity restriction in three parts: connectivity calendar 1410, connectivity blacklist 1450, and connectivity whitelist 1480. Connectivity calendar 1410 may display a plurality of connectivity restriction flags in timeslots (e.g., timeslot 1420). An exemplary restriction flag 1430 may denote that the target electronic device is restricted or non-restricted from one or more specified connectivity services (e.g., voice, text messaging, multimedia messaging, content download and upload, and the like) for a specified time slot (e.g., 12 a.m.-6 a.m. on Sunday). When restriction flag 1430 is set to restricted, the target electronic device may not access the one or more specified connectivity services during the specified timeslot.

Regardless of the restriction status for the specified timeslot, connectivity blacklist 1450 prevents the target electronic device from calling, receiving calls from, or communicating with (e.g., text messaging, multimedia messaging, electronic mailing, and the like) blacklisted telephone numbers (e.g., 1-900 numbers) or electronic mail addresses stored in connectivity blacklist 1450, and connectivity whitelist 1480 allows the target electronic device to call, receive calls from, or communicate with whitelisted telephone numbers (e.g., telephone number of an electronic device associated with a supervisory member in the group, emergency telephone numbers such as 911) or electronic mail addresses stored in connectivity whitelist 1480. In an embodiment consistent with the present disclosure, device 100 may allow an electronic device associated with a supervisory member of the group to call or communicate with device 100 at any time, without regard to the restriction status applicable to device 100 for the specified timeslot. In addition, regardless of the restriction status for the specified timeslot, connectivity blacklist 1450 prevents the target electronic device from accessing or downloading content from blacklisted web sites (e.g., adult-oriented web sites) stored in connectivity blacklist 1450, and connectivity whitelist 1480 allows the target electronic device to access or download content from whitelisted web sites (e.g., weather web sites, news web sites) stored in connectivity whitelist 1480.

Next, in stage 1340, device 100 may update the connectivity restriction (e.g., connectivity calendar 1410, connectivity blacklist 1450, and connectivity whitelist 1480) of the target electronic device in accordance with the user's input. For example, the user may select and update a connectivity restriction flag for a specific timeslot (e.g., timeslot 1430).

The user may add a telephone number into connectivity blacklist 1450 by entering the telephone number and a name associated with the telephone number, then selecting an "Add" button 1455. The user may delete a telephone number from connectivity blacklist 1450 by selecting a "Delete" button 1460 associated with the telephone number. Similarly, the user may add a telephone number into connectivity whitelist 1480 by entering the telephone number and a name associated with the telephone number, then selecting an "Add" button 1485, and delete a telephone number from connectivity whitelist 1480 by selecting a "Delete" button 1490 associated with the telephone number. At any point in stage 1350, the user may save the updated connectivity calendar 1410 by, for example, operating the OK key (as shown in FIG. 1C) or selecting a "Save" button 1440, or cancel any updates by operating the BACK key (as shown in FIG. 1C) or selecting a "Cancel" button. Similarly, at any point in stage 1350, the user may save updated connectivity blacklist 1450 and connectivity whitelist 1480 by, for example, operating the OK key (as shown in FIG. 1C) or selecting a "Save" button 1445, or cancel any updates by operating the BACK key (as shown in FIG. 1C) or selecting a "Cancel" button.

Systems and methods consistent with the present invention may be implemented by computers organized in a conventional distributed processing system architecture. FIG. 15 is a block diagram illustrating a computer system 1500 in which an embodiment consistent with the invention may be implemented. Computer system 1500 includes a computer 1501 having a bus 1502 or other communication mechanism for communicating information, and a processor 1504 coupled with bus 1502 for processing information. Computer 1501 also includes a main memory, such as random access memory (RAM) 1506 or other dynamic storage device, coupled to bus 1502 for storing information and instructions by processor 1504. RAM 1506 also may be used for storing temporary variables or other intermediate information during execution of instructions to be executed by processor 1504. During operation, some or all portions of an operating system (not shown) are loaded into RAM 1506. Computer 1501 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer 1501 may be coupled via bus 1502 to a display 1512, such as a cathode ray tube (CRT), for displaying information to a computer user. In an exemplary embodiment of the present disclosure, computer 1501 may display user interfaces (e.g., user interfaces 900-920, 1200, and 1400) on display 1512. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device may have two degrees of freedom in two axes, a first axis (e.g., x) and a second axis (e.g., y), which allow the device to specify positions in a plane.

Computer system 1500 may further include an input drive device 1517, such as a CD reader, for reading high-capacity computer-readable media, such as CD-ROMs and CDRs. The invention may utilize computer system 1500 for providing group management and graphical user interfaces for associated electronic devices. According to one implementation, systems and methods consistent with the present invention provide group management, connectivity management, monitoring tools, and graphical user interfaces for associated mobile electronic devices having small-screen electronic displays in response to processor 1504 executing one or more sequences of one or more instructions contained in RAM 1506. Such instructions may be read into RAM 1506 from a computer-readable medium via an input device such as storage device 1510. Execution of the sequences of instructions contained in main memory 1506 causes processor 1504 to perform the process steps described herein. For example, the sequences of instructions may be a web-enabled application (e.g., application for locating electronic devices, application for managing electronic devices, etc.) that displays web browser-based user interfaces (e.g., user interfaces 900-920, 1200, and 1400) accessible to users over the Internet. Further, web browser-based user interfaces may be developed using high-level programming languages such as Java®, C#, or ASP+, and may be deployed on servers such as a WebSphere application server and Apache HTTP server. In an alternative implementation, hard-wired circuitry may be used in place of or in combination with software instructions to implement the invention. Thus, implementations consistent with the principles of the present invention are not limited to any specific combination of hardware circuitry and software.

Computer 1501 also includes a communication interface 1518 coupled to bus 1502. Communication interface 1518 provides a two-way data communication coupling to a network link 1520 that is connected to local network 1522. For example, communication interface 1518 may be an integrated services digital network (ISDN) card or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to host computer 1524 (e.g., content server 322, wireless server 312, and the like) and/or to data equipment operated by Internet Service Provider (ISP) 1526. ISP 1526, in turn, provides data communication services through the Internet 1528. Local network 1522 and Internet 1528 both use electric, electromagnetic, or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1530 (e.g., content server 322, wireless server 312, and the like) might transmit a requested code for an application program through Internet 1528, ISP 1526, local network 1522, and communication interface 1518. The received code may be loaded in RAM 1506 and executed by processor 1504 as it is received. Alternatively, or in addition, it may be stored in storage device 1510, or other non-volatile storage for later execution. In this manner, computer system 1500 may obtain application code in the form of a carrier wave.

Although computer system 1500 is shown in FIG. 15 as connectable to one server 1530, those skilled in the art will recognize that computer system 1500 may establish connections to multiple servers on Internet 1528. Such servers may include an HTML-based Internet application, which may provide information to computer system 1500 upon request in a manner consistent with the present invention.

As described above, systems and methods consistent with the present disclosure provide for intuitive navigation across broad content, without regard to the size of the display screen or the type of user input devices present on the device. Further, systems and methods consistent with the present disclosure provide users with group management tools, group monitoring tools, and user interfaces for managing associated electronic devices. Other embodiments of the present disclosure will be apparent to those skilled in the art from consideration of the specification and practice of the concepts disclosed herein. It is intended that the specification and examples be considered as exemplary only, with a true scope and spirit of the invention being indicated by the following claims.

What is claimed is:

1. A method for managing portable phones in a previously defined group of portable phones including a managing portable phone, the method comprising:
   displaying, on the managing portable phone, the previously defined group of portable phones;
   selecting, by the managing portable phone, a portable phone other than the managing portable phone from the displayed group of portable phones;
   retrieving, by the managing portable phone, a permitted list of portable phones in the group that are permitted to obtain navigational directions to a geographic location of the selected portable phone;
   retrieving, by the managing portable phone, a prohibited list of portable phones in the group that are not permitted to obtain the navigational directions to the geographic location of the selected portable phone; and
   updating, by the managing portable phone, the retrieved permitted list and the retrieved prohibited list, wherein updating the retrieved permitted list and the retrieved prohibited list comprises:
      displaying, on the managing portable phone, the retrieved permitted list and the retrieved prohibited list;
      moving, in response to a user input, one or more portable phones in the group from the permitted list to the prohibited list or from the prohibited list to the permitted list; and
      displaying, on the managing portable phone, the updated permitted list and the updated prohibited list.

2. The method of claim 1 further comprising:
   providing a conditional list of portable phones in the group that are permitted to locate the selected portable phone upon substantially contemporaneous consent of the selected portable phone, wherein at least one of the portable phones from the conditional list of portable phones is provided with navigational directions to locate the selected portable phone.

3. The method of claim 2 further comprising providing, by the managing portable phone, the updated permitted list or the updated prohibited list to a central server.

4. The method of claim 1, wherein the permitted list and the prohibited list are retrieved by the managing portable phone from a central server.

5. A managing portable phone in a previously defined group of portable phones, the managing portable phone comprising:
   a display; and
   a processor configured to:
   display, on the display, the previously defined group of portable phones;
   select a portable phone other than the managing portable phone from the displayed group of portable phones;
   retrieve a permitted list of portable phones in the group that are permitted to obtain navigational directions to a geographic location of the selected portable phone;
   retrieve a prohibited list of portable phones in the group that are not permitted to obtain the navigational directions to the geographic location of the selected portable phone; and
   update the retrieved permitted list and the retrieved prohibited list, wherein updating the retrieved permitted list and the retrieved prohibited list comprises:
   displaying, on the display, the retrieved permitted list and the retrieved prohibited list;
   moving, in response to a user input, one or more portable phones in the group from the permitted list to the prohibited list or from the prohibited list to the permitted list; and
   displaying, on the display, the updated permitted list and the updated prohibited list.

6. The managing portable phone of claim 5, wherein the processor is further configured to:
   provide a conditional list of portable phones in the group that are permitted to locate the selected portable phone upon substantially contemporaneous consent of the selected portable phone, wherein at least one of the portable phones from the conditional list of portable phones is provided with navigational directions to locate the selected portable phone.

7. The managing portable phone of claim 5, wherein the processor is further configured to provide updated permitted list or the updated prohibited list to a central server.

8. The managing portable phone of claim 5, wherein the permitted list and the prohibited list are retrieved from a central server.

* * * * *